July 18, 1961 W. B. THOMSON ET AL 2,992,981
NEUTRONIC REACTOR CORE
Filed Oct. 29, 1953 17 Sheets-Sheet 1

INVENTORS
Wallace B. Thomson
Austin Corbin, Jr.
BY

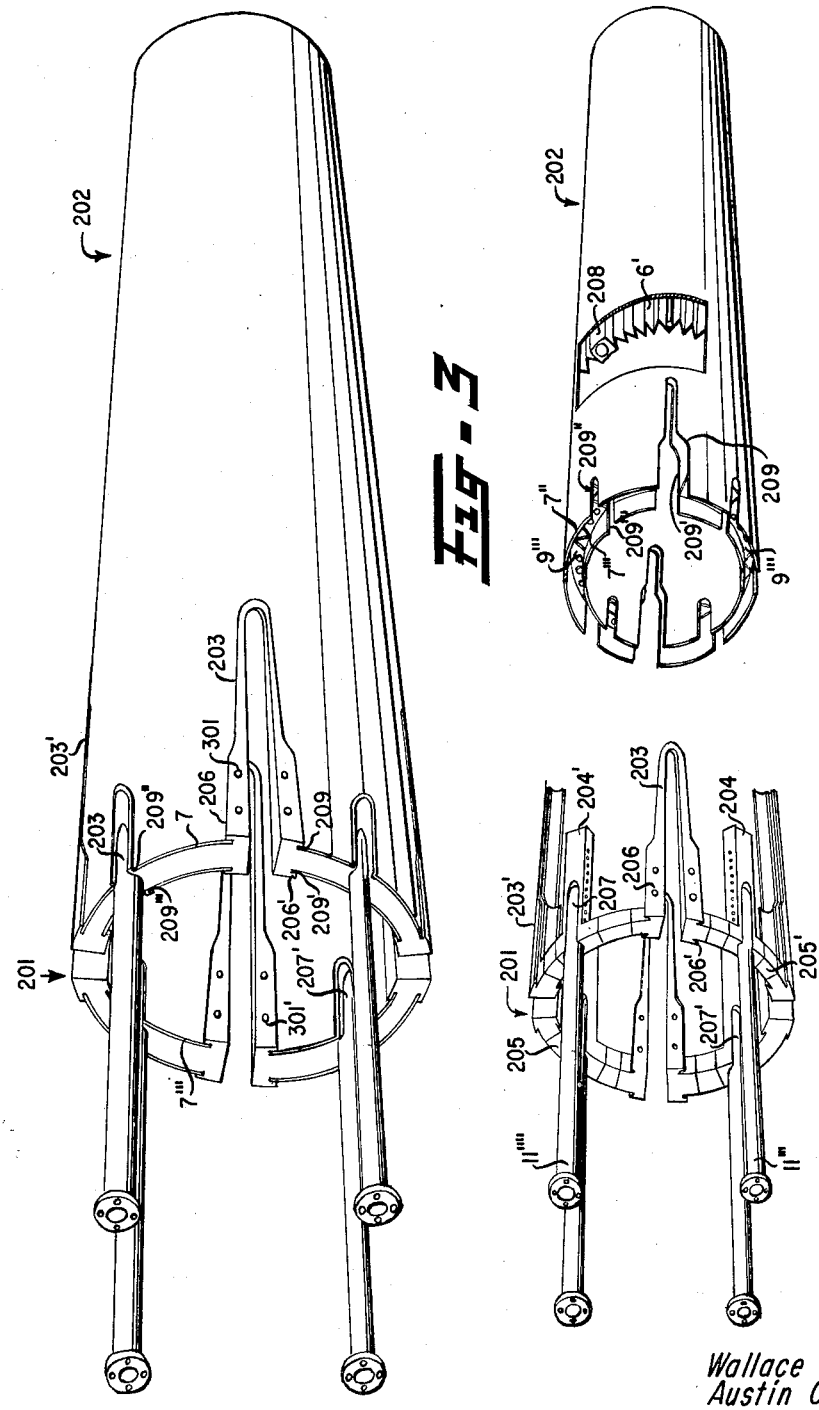

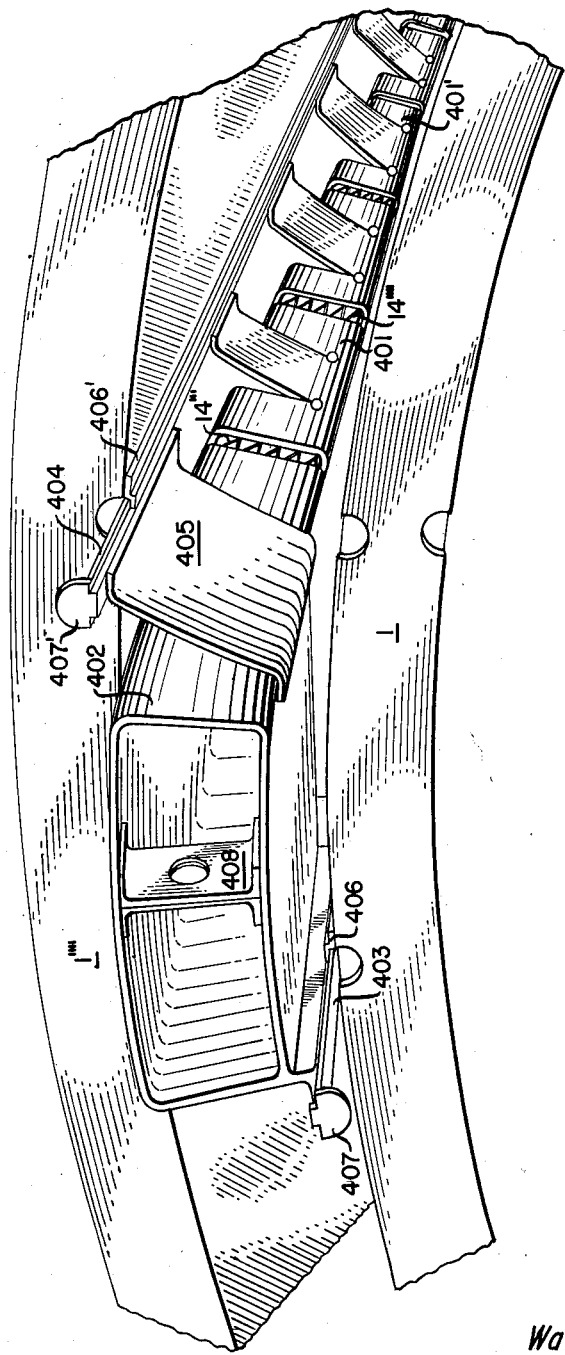

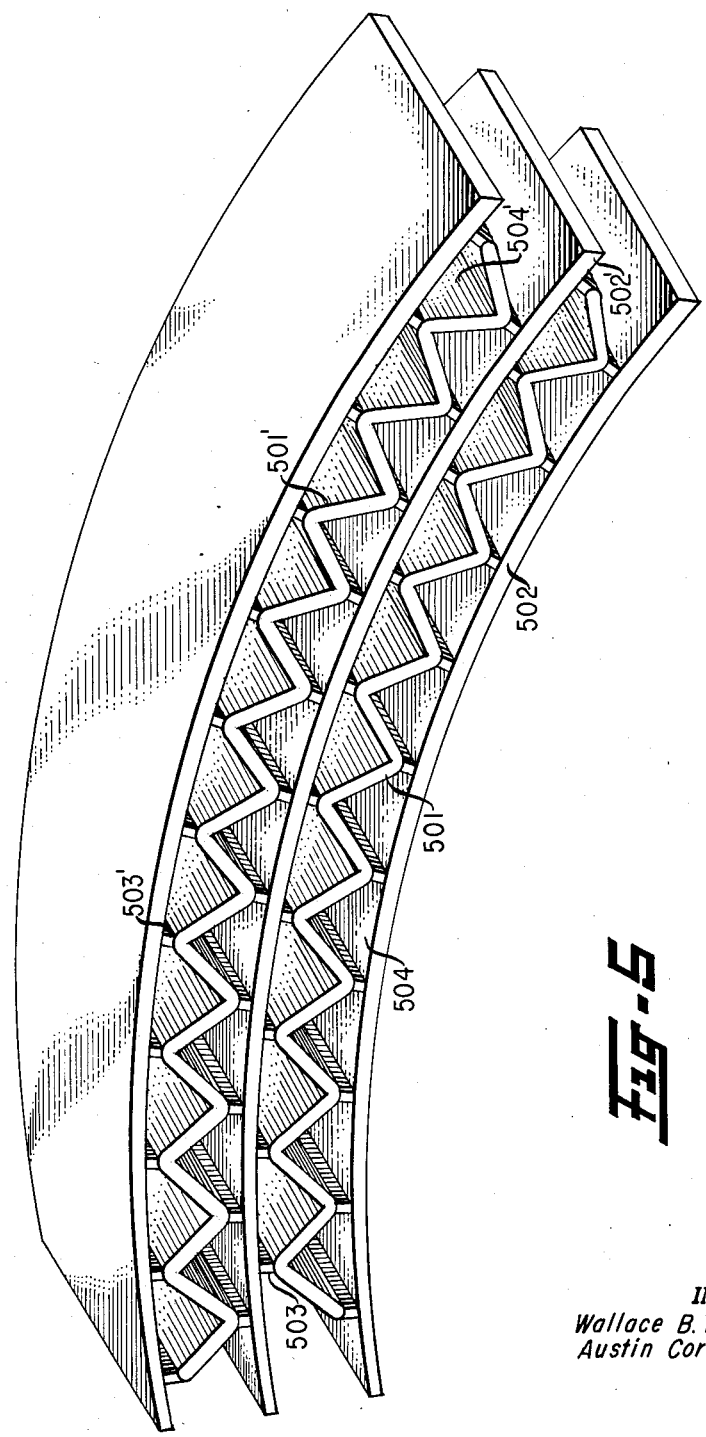

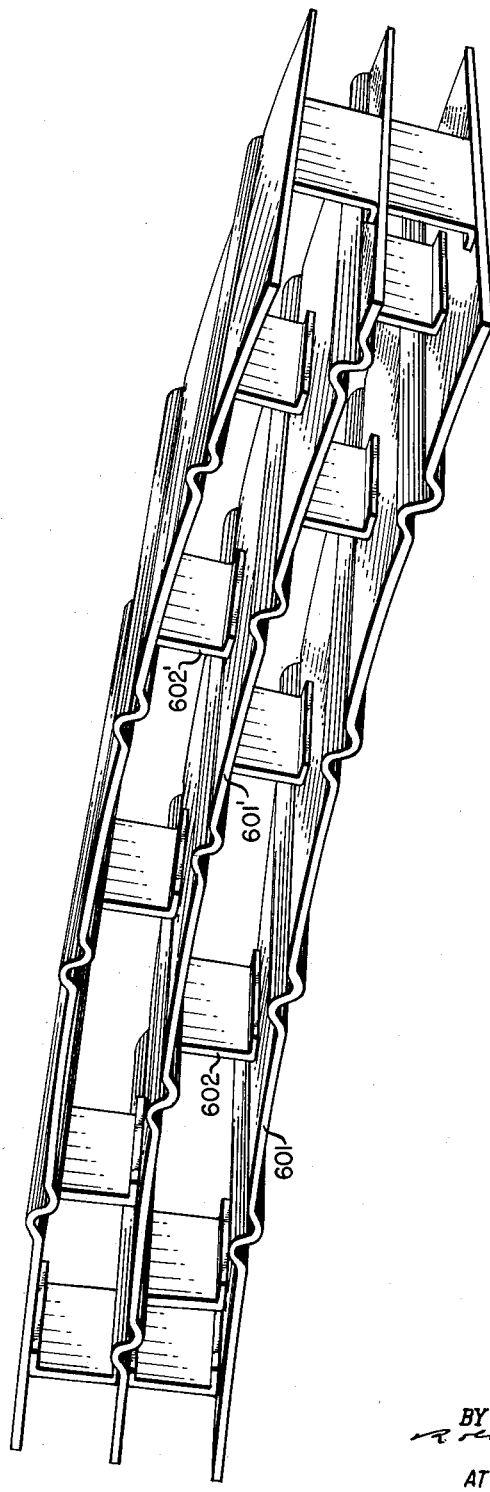

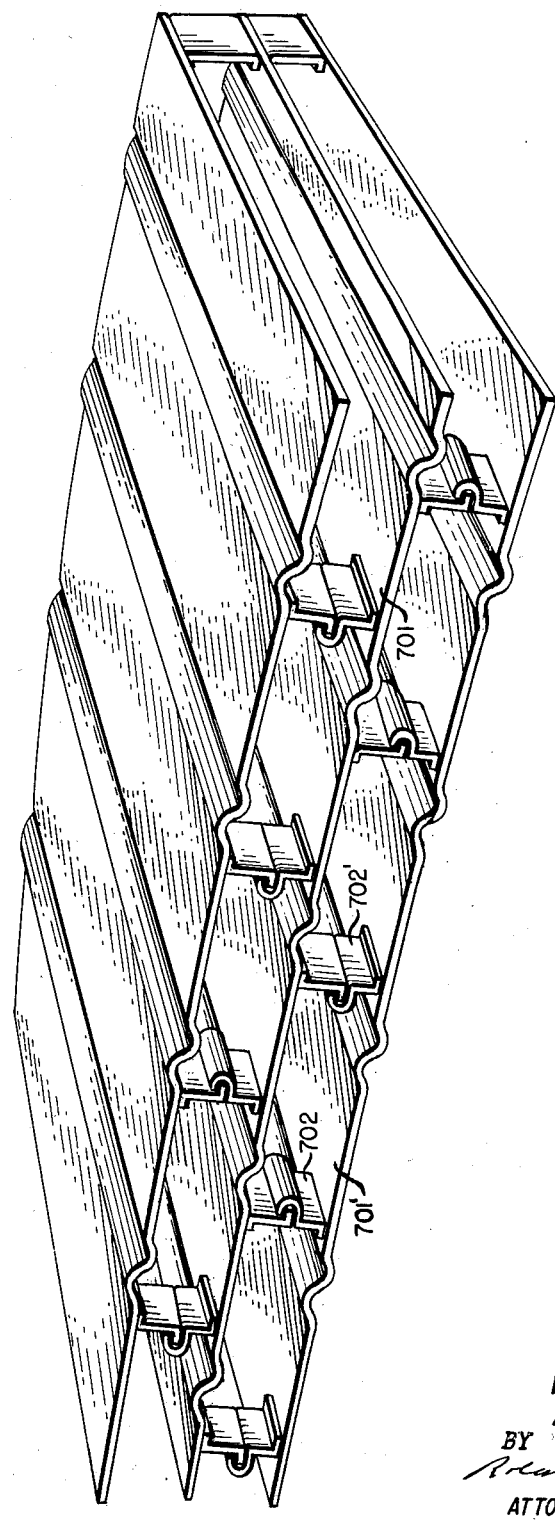

July 18, 1961 W. B. THOMSON ET AL 2,992,981
NEUTRONIC REACTOR CORE
Filed Oct. 29, 1953 17 Sheets-Sheet 7

INVENTORS
Wallace B. Thomson
Austin Corbin, Jr.
BY
ATTORNEY

INVENTOR.
Wallace B. Thomson
Austin Corbin, Jr.
BY

ATTORNEY

INVENTOR.
Wallace B. Thomson
Austin Corbin, Jr.
BY

ATTORNEY

July 18, 1961   W. B. THOMSON ET AL   2,992,981
NEUTRONIC REACTOR CORE
Filed Oct. 29, 1953   17 Sheets-Sheet 14

INVENTORS
WALLACE B. THOMSON
AUSTIN CORBIN Jr
BY

ATTORNEY

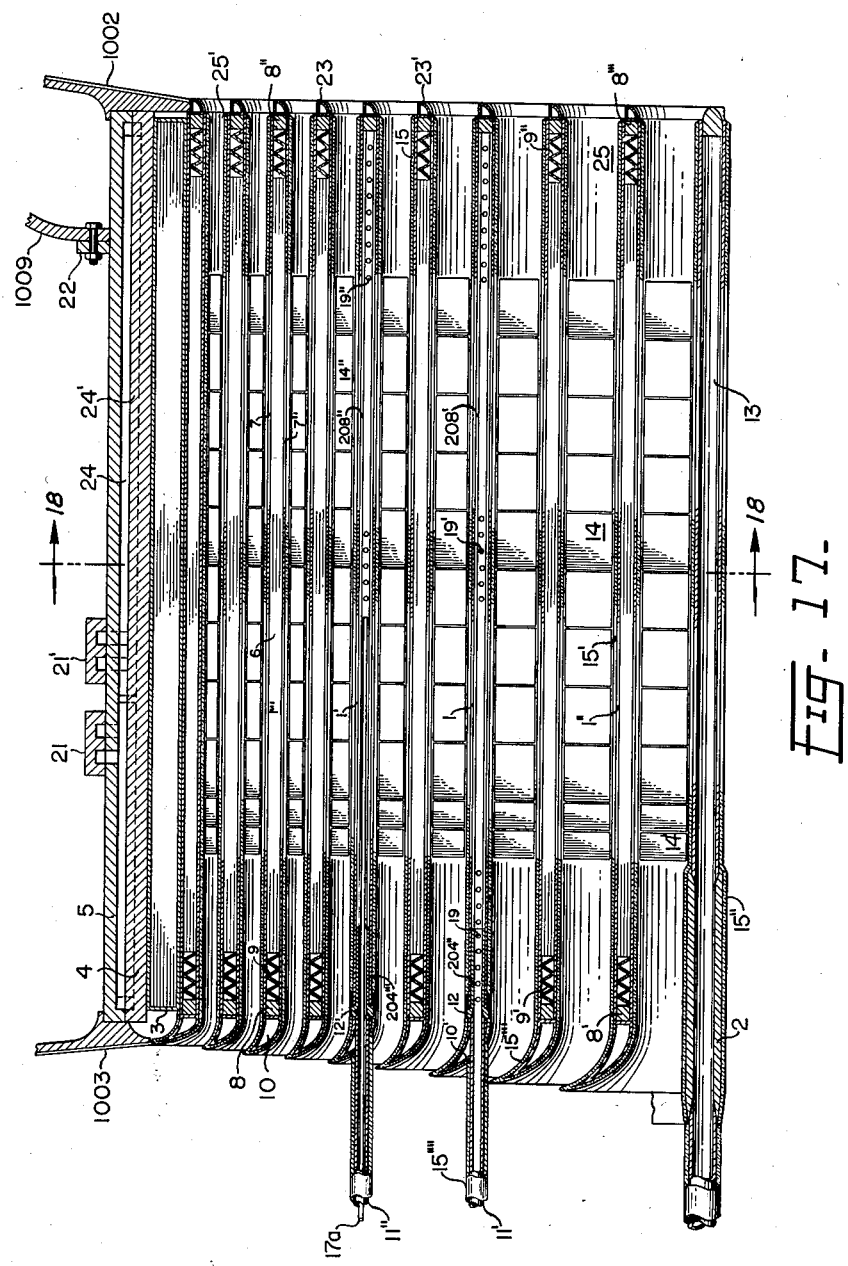

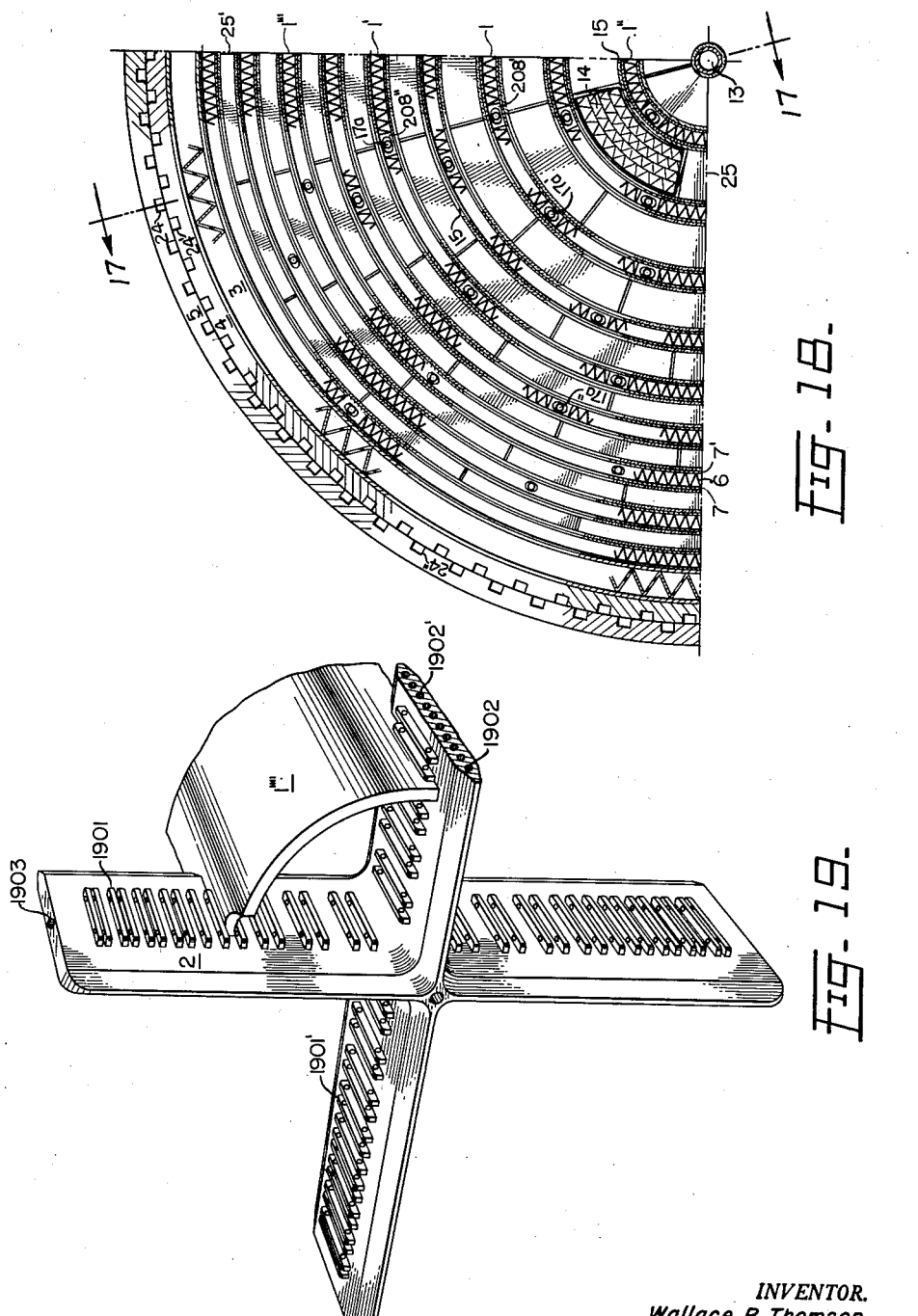

July 18, 1961   W. B. THOMSON ET AL   2,992,981
NEUTRONIC REACTOR CORE
Filed Oct. 29, 1953   17 Sheets-Sheet 17
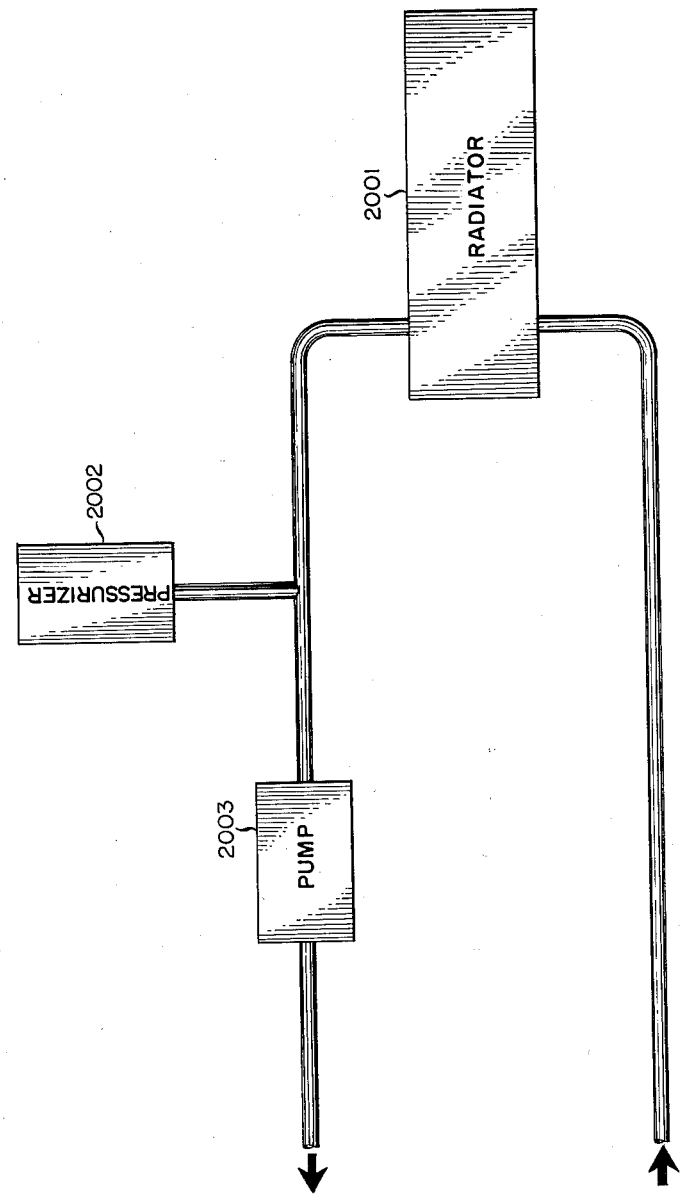
Fig-20-
INVENTORS
Wallace B. Thomson
Austin Corbin, Jr.
BY

2,992,981
NEUTRONIC REACTOR CORE

Wallace B. Thomson and Austin Corbin, Jr., Cincinnati, Ohio, assignors to the United States of America as represented by the United States Atomic Energy Commission
Filed Oct. 29, 1953, Ser. No. 389,182
28 Claims. (Cl. 204—193.2)

The present invention relates in general to neutronic reactors, and more particularly to an improved manner of neutron moderation and structural support of the cores of neutronic reactors adapted to production of thermal energy at high specific power density levels, especially for reactors adapted to propulsive power production for mobile applications.

For further information and details as to the theory, construction, and operation of neutronic reactors generally, reference may be made to the following sources:

"The Elements of Nuclear Reactor Theory," by S. Glasstone and M. C. Edlund, Van Nostrand, 1952;

"The Science and Engineering of Nuclear Power," edited by Clark Goodman, vol. 1 (1947) and vol. 2 (1949), Addison-Wesley;

"First Detailed Description of The AEC Research Reactors," in Atomics, vol. 6, November-December 1950; and co-pending applications of the common assignee:

S.N. 321,078, filed November 18, 1952, in the names of Charles E. Winters, Clifton B. Graham, Joseph S. Culver, and Robert H. Wilson, for Improved Neutronic Reactor Operational Method and Core System, now U.S. Patent No. 2,945,794, issued July 19, 1960;

S.N. 355,262, filed May 15, 1953, in the names of Clifton B. Graham and Irving Spiewak, for Improved Neutronic Reactor Control Method and System, now U.S. Patent No. 2,938,844, issued May 31, 1960;

S.N. 578,278, filed February 16, 1945, in the names of Enrico Fermi and Miles C. Leverett, for A Chain Reacting System, now U.S. Patent No. 2,837,477, issued June 3, 1958;

S.N. 596,465, filed May 29, 1945, in the names of Enrico Fermi and Leo Szilard for Air Cooled Neutronic Reactor, now U.S. Patent No. 2,836,554, issued May 27, 1958;

S.N. 194,331, filed November 6, 1950, in the name of George A. Anderson, for Neutronic Reactor, now U.S. Patent No. 2,780,596, issued February 5, 1957;

S.N. 206,592, filed January 18, 1951, in the name of George A. Anderson, for Fuel Element Loading Apparatus for Neutronic Reactors, now U.S. Patent No. 2,794,562, issued June 4, 1957.

Particular reference is made to Goodman, vol. 1, op. cit., Table 9–5, pages 291–293, which sets forth thermal neutron absorption cross sections and other nuclear data for most of the chemical elements.

In principle, the neutronic reactor is readily adapted to aircraft propulsion by simply substituting the same for the chemical combustion chambers in a conventionally designed aircraft gas turbine propulsion engine, especially of the turbo-jet and turbo-propeller-jet types. With this arrangement, employing for example a turbo-jet type engine, a continuous stream of atmospheric air, in conventional fashion, enters the nose of the engine through a diffuser, whereupon it is compressed by a compressor therein. Thereupon, the compressed air is ducted, in heat-exchange relationship, through the core of a neutronic reactor operating at a high temperature, whereupon it becomes substantially heated. Again, conventionally, the resulting substantially-heated compressed air is passed through a gas turbine mechanically coupled to the said compressor, where, in passing therethrough, the air partially expands to provide energy for driving said compressor; finally, upon leaving a compressor, the air is jetted rearward to the atmosppphere so as, by completing its expansion, to provide propulsive energy for driving the aircraft forward. Commercial turbo-jet aircraft engines in standard production may readily and conveniently be modified converted to this service simply by removing the usual fuel combustion tubes therefrom, and in their place inserting a receiving scroll at the compressor outlet for collecting and ducting the compressed air to the reactor, and a delivery scroll at the inlet to the turbine for receiving the air returning from the reactor. One or more such converted turbo-jet engines may be employed with a single reactor. Too, neutronic reactor core design is amenable to the incorporation therein of a series of ducts for passing air therethrough to contact large areas per unit volume of solid internal core surfaces in heat conductive relationship with fissioning fuel. Air, by virtue of the very low atomic density of its gaseous state, is favorably acceptable, from the standpoint of minimizing nuclear interference with fission reaction, as a component of the reactor core. The potentialities of this rather simple aircraft propulsion arrangement are singularly impressive: as the neutronic fission reaction is inherently capable of controllably producing thermal energy at any desired rate, sufficient propulsive power is inherently available for virtually any aircraft speed and performance that other design considerations will permit, and as the enormous specific energy content of the fissionable fuel, in rendering insignificant the maximum fuel capacity consideration which was formerly the controlling factor limiting aircraft range, makes inherently available simultaneously effective elimination of range limitations to earth-bound aircraft.

In practice, however, successful design of such of an aircraft propulsion system of such type, particularly the neutronic reactor component thereof, has for some time been seriously obstructed by the problem of providing materials of construction which would serve satisfactorily under the very high specific volumetric power production densities needed to effectively propel an airplane bearing the weight and bulk of the reactor system itself. This problem derives primarily from the necessity for enveloping the reactor and/or the human crew and delicate instruments in a ponderous bulk of radiation shielding in order to protect these sensitive entities from the enormous quantities of and intensities of biologically and technically harmful radiations—chiefly neutrons and gamma rays— characteristically emitted from a high-power-producing neutronic reactor. For example, aircraft reactor shielding systems regarded as the most advanced and superior so far devised, when applied to afford tolerable protection from a reactor core operating at a representative rate of the order of $10^{15}$ fissions per second, comprise about 3 to 3½ feet of dense media enveloping the reactor, along with about 1 to 2 feet of lead enveloping a crew compartment (wherein the human crew and other radiation-sensitive entities are crowded) located as far away from the reactor core as practicable. For a reactor core of representative dimensions approximating a horizontal right square cylinder of 3 feet radius such reflector and shield system would involve a minimum of approximately 60 to 65 tons of media enveloping the reactor core, together with a crew shield weighing approximately 20 to 25 tons even when spaced some 60 to 75 feet away from the reactor core, amounting to a total shield weight of ca. 85 tons. A conventionally-designed aircraft neutronic reactor of the aforesaid size, itself, may be estimated to weigh about 5 to 10 tons, while modified production-model turbo-jet engines appropriate for propulsion of such weights may be estimated to contribute another 10 to 15 tons of weight. Consequently, the weight of the basic nuclear propulsion system, together with the necessary shielding, so constituted would amount to approximately 105 tons. Further, a suitably manned and equipped air-frame, for this general weight range, is found to weigh as a general rule, roughly 1 to 1¼ the weight of the nuclear propulsion system provided therefor; thus an air-frame weight of approximately 115 to 120 tons is appropriate. Consequently, the minimum weight of a manned nuclear-powered airplane so designed would be something of the order of 220 to 225 tons—i.e. 440,000 to 450,000 pounds; too, with the dimensions of the reactor core radius and thickness of shielding enveloping the reactor core, a fuselage cross sectional area of approximately 133 square feet is needed. For an airplane of this magnitude, speed and performance of merely of the ranges common in domestic commercial passenger-carrying airplanes would require about 30,000 to 35,000 pounds thrust (sea level, static). Considering that turbo-jet engines in contemporary production are restricted to a normal turbine inlet temperature of 1400° F. by the high-temperature limitations of metals of turbine construction, such propulsive thrust would require air flow through the reactor at a rate of approximately 800 to 1,000 pounds per second, and a rate of heat transfer from the reactor thereto of the order of 175,000 to 225,000 B.t.u.'s per second. Engineering computations have made it quite apparent that for aircraft reactor cores of design conventional prior to the present invention—of the nature alluded to hereinabove—accomplishing this enormous rate of heat transfer to this great mass flow of air, all within the limited volume of reactor core, requires temperatures at least as great as 2000 to 2250° F. for the materials within the core serving to heat the air exiting at 1400° F. As it is well known that common metals of construction, in general, as well as metallic uranium and beryllium for example in particular, are so structurally weak at these high temperatures as to be practically unuseable, it has become generally accepted that the form of the neutron moderator and fissionable fuel provided in an aircraft reactor core is thus restricted to refractory ceramic material. However, ceramics characteristically are generally possessed of substantially lower tensile strength, compressive strength, and shear resistance than common structural metals, such that individual reactor core elements in ceramic form must be thicker and coarser-structured than if made of metal; too, ceramic surfaces generally tend to possess somewhat lower coefficients of heat transfer to air than do metal surfaces. Accordingly, with ceramics, considerably less heat-transferring surface area may be incorporated per unit volume of reactor core. So, as the same quantity of heat must be transferred from the resulting smaller surface area and with the lower heat transfer coefficient, considerably still higher temperatures of the heat-transferring surfaces become necessary. As an ultimate result, extensive precise overall engineering designs of such neutronic-reactor-powered aircraft have established that, as a general lower limit, the required operating temperature of the heat-transferring surfaces of the ceramic neutron moderant—containing fissionable material also in ceramic form, distributed either in discrete lumps or homogeneous dispersion therein—rather closely approximates the formidable temperature of 2500° F. Attempts toward reducing this inordinate required temperature are hardly of any avail. That is, any increase in the volume of the reactor core will, employing still the same thickness of reflector and shielding enveloping the core, result in a much larger increase in the total volume of the entire core-reactor-shield assembly, since the quantitative magnitude of additional volume imparted by a given increment of added radius is generally proportional to the cube of the radial distance of the increment from the geometric center. Consequently, any small increase in reactor core volume will result in a much larger increase in the bulk and mass of the shielded reactor, along with concomitant increases in the air-frame, propulsive engines, and propulsive thrust needed to accommodate the same, such that the slightly enlarged reactor core would have to operate at an even higher temperature to afford aviation of the substantially enlarged system. In the other direction, reduction of reactor core volume toward reducing overall shield, air frame, and engine bulk, and thus affording lower temperature of the reactor-core-heat-transferring surfaces is limited to a practical, sizeable, minimum of core volume dictated, in any given case, primarily by the volumetric efficiency of the neutron moderant employed. That is, a large portion of the reactor-core volume must be devoted to air passages in order to afford transit of the great mass flow of air therethrough with reasonably low pressure drop; the moderant and fissionable fuel are limited to occupancy of the remaining volumetric proportion of the reactor core. For these, a sufficient proportionation between the selected neutron moderator to the selected fissionable fuel is adopted to afford effective thermalization of the neutrons propagating the chain reaction, and a sufficient absolute amount of moderator and fuel in such proportion must be provided to afford a supercritical amassment of the same when so geometrically disposed as interlaced about the capacious air passages. Thus, the lower the volumetric moderating efficiency of the neutron moderator selected, the larger will be the practical minimum of reactor core volume. For conventional ceramic neutron moderants, the aforementioned reactor core size corresponding to a square right cylinder of three feet radius falls close to the practical minimum value for conventional neutron moderants of ceramic form.

The obtaining need for providing a ceramic structure capable of satisfactorily withstanding the rigors of 2500° F., in conjunction with a rapid flow of air across extensive exposed surfaces thereof at that temperature, poses a serious problem. In the present instance this problem is compounded by a preclusive difficulty in providing any separate internal mechanical supporting structure at all within the core under these conditions. In mobile aircraft propulsion application, the substantial tilting, jarring, vibration, and extra-gravitational forces which the reactor core must withstand in such service make structural provisions for supporting positioning, and anchoring the ceramic fuel-moderant components highly important. More particularly, any internal mechanical supporting structure within the reactor core must satisfy principally two criteria: first, the overall neutron absorptivity of the entire support structure must be very low, because the incorporation of even small amounts of absorptivity deleteriously increases considerably the size of core needed for supercriticality, while larger amounts of absorptivity can fatally disrupt and prevent chain fission reaction altogether; and second, the total space occupied, in a fashion non-contributive to neutron moderation, of the supporting structural components must be relatively small, again to avoid deleteriously enlarging the size of the core in compensation for the valuable space within the core occupied by the supporting structure. Known structural metals which have sufficiently low neutron absorption cross sections to meet the first criterion have been found to be much too weak structurally at 2500° F. for application to this service; a separate mechanical supporting structure of ceramic material, which would generally have to be bulky in view of the relatively low strength of ceramics at these temperatures, is largely precluded by the second criterion. Therefore, prior to the present invention, it had become accepted that the ceramic core, operating at 2500° F., had to be entirely self supporting. Need for mitigating extreme thermal stresses and thermal cracking of large ceramic masses dictated constitution of the core of a clustered multiplicity of small ceramic blocks provided with mutually-registering longitudinal air passages, with the entire array loosely retained to afford adequate thermal expansion upon heating. Without supporting structure such blocks would be destined to rattle around, unfixed with respect to one another, within the operating core. Resulting misalignment, intensified by thermal warping, of the air passages in successive ceramic blocks would likely induce excessive thermal stresses and promote extensive thermal cracking of the ceramic; substantial disintegration of just one ceramic block, in the absence of separate structural support, could expectably lead to progressive thermal self-destruction of the reactor core in short order.

As the paramount difficulty stemming from all of the foregoing factors, the inability to find any ceramic neutron-moderant material satisfactory in all of these various respects became accepted, prior to the present invention, as a virtually insuperable obstacle to the practical design of such a direct air-cycle nuclear aircraft propulsion system. Briefly, as definitive of the problem, the requirements for a ceramic moderant for this application may be summarized as follows:

(1) Ceramic must be refractory—capable of withstanding 2500° F.;
(2) Ceramic must be a good neutron moderant—i.e., must have a good volumetric neutron-moderating efficiency;
(3) Ceramic must have a low neutron absorption cross section;
(4) Ceramic must withstand severe thermal stresses;
(5) Ceramic must be capable of containing, and inescapably restraining, fissionable material in ceramic form distributed therein either as discrete lumps or in substantially homogeneous dispersion;
(6) Ceramic must have relatively high mechanical strength, such that the entire core may be self-supporting;
(7) Ceramic must be oxidation, erosion, abrasion, and corrosion resistant, and preferably self-coating; and
(8) Ceramic must withstand the insidious destructive effects of intense nuclear radiation.

Despite an intensive investigative and development effort throughout this particular art up to the time of the present invention, it is considered that none of the ceramics considered actually met satisfactorily all of these requirements. Unfortunately, requirements 2 and 6, in particular, radically limit the field of selection from among the known ceramic materials. Certain ceramics were recognized which can withstand 2500° F. and are reasonably satisfactory in the other respects, particularly those materials used commercially for electric resistance heating elements—notably silicon carbide, and especially silicon-bonded silicon carbide, bodies—but these were found unsatisfactory from the standpoint of requirements 2 and 6. Of those ceramic materials which are reasonably good neutron-moderants, and thus satisfy requirement 2, about the best available appeared to be dense bodies of beryllium carbide and graphite compounded in approximately 70% to 30% proportionation. While these could be raised to 2500° F. and still retain their structural integrity, their ability under operational conditions of rapid air flow with respect to withstanding extensive cracking and breakage, to retaining highly-U-235-enriched uranium carbide fuel dispersed therein, and to resisting rapid, destructive erosion of the ceramic surfaces subjected to the air flow, left very much to be desired; in short, under operational conditions these elements generally underwent disintegration to utter destruction and uselessness in a matter of an hour or so—much too short a time for effective aircraft propulsion application. Furthermore, there was no particularly favorable indication that there was any promise that any ceramic material satisfactorily meeting all of the aforementioned requirements was possible of development within the foreseeable future. This inability to find a suitable ceramic moderant satisfactory at 2500° F., together with the inability to do much more by way of careful optimization of shielding, air-frame, and engine parameters toward reducing this high temperature requirement, presented a grave impasse to the design of any nuclear aircraft propulsion system operating upon the air cycle. However, since the air-cycle, per se, possesses outstanding advantages of heat-transfer, thermodynamic, and operational simplicity, for this service it has remained highly desirable that improved materials, means, methods, and/or measures be found for circumventing this impasse and affording effective design and operation of an air-cycle nuclear aircraft propulsion system.

Accordingly, one object of the present invention is to provide a new and improved core system for a gas-cooled neutronic reactor, and especially for such a reactor adapted to aircraft propulsion employing the air-cycle.

Another object is to provide such a core system which admits of operation at heat-transferring-surface temperatures of ca. 2500° F.

A further object is to provide, more particularly, a new and improved means for neutron moderation and structural support in such a neutronic reactor core.

Still another object is to provide such a core system which affords operation with known ceramic materials of poor or little neutron moderating efficiency.

Still a further object is to provide such a core system which affords operation with structurally weak ceramic materials.

Yet another object is to provide such a core system which admits of reduction in core volume.

Yet a further object is to provide such a core system which admits of operation at lower heat-transfer-surface temperatures.

Again another object is to provide such a core system which admits of effective aircraft propulsion application employing metal surfaces for transferring heat to the propulsive air stream.

Again a further object is to provide such a core system which affords effective neutronic-reactor-powered aircraft of smaller, lighter, and thus more reasonable and practicable size and weight.

In addition another object is to provide such a core system which affords a compact, unitary nuclear aircraft propulsion plant which utilizes modified turbo-jet engines of contemporary commercial production and which is adapted to speedy and simple installation in existing aircraft also of contemporary commercial production.

In addition a further object is to provide such a core system which admits of improved control of the chain fission reaction and thus increases the resistance of the reactor to the chance of any hapless, runaway, uncontrolled chain fission reaction.

Furthermore another object is to provide such a core system of markedly enhanced fitness and suitability for practical construction and application.

Moreover, another object is to provide a reactor core capable of simpler, and more economical and convenient fabrication with more common engineering materials and practices.

Additional objects will become apparent hereinafter.

Applicants have devised, and established the practical efficacy of, a means for capably circumventing and avoiding this grave impasse, representing a fundamentally different and unconventional attack upon the entire problem of power reactor core construction. As the foundation for the present means, applicants have found and shown it possible, by providing within a reactor core a fine-structured openwork lattice of water having a system of metal structural core-supporting members in intimate heat-transfer relationship therewith, and by pressurization of the water to a reasonable degree, by continuous circulation of said water through a cooling means at a reasonable rate, and by encasing the water and system of structural members all in efficient thermal insulation of remarkably diminutive thickness, to supply all necessary neutron-moderant and an adequate internal core-supporting mechanical structure, affording effective service where the remainder of the core is operated at temperatures of the order of 2500° F. With such arrangement, the thermal insulation and the circulation of the water through a cooling means—preferably external the core—enables the water, interlaced as a fine-structured lattice throughout a region of ca. 2500° F. ambient temperature, to be maintained at such relatively low temperatures as to remain in liquid state upon pressurization merely to practicable superatmospheric pressures; in this way all necessary neutral moderation for the core may be provided by the water matrix. Likewise, the thermal insulation and circulation of the water, through enabling the water and the mechanical structural members in intimate heat-transfer relationship therewith to remain at temperatures adequately low, permits effective use of common metals of construction of low neutron absorptivity for the core-supporting purpose. The remainder of the reactor core may effectively be constituted of ceramic blocks, said blocks containing fissionable material distributed therein, supported largely by the mechanical supporting members in the insulated matrix, to constitute the fissionable fuel, and also provided with air passages for passing the continuous stream of air in heat-transfer relationship with the hot ceramic surfaces. Significantly, the provision of the water-structural-support matrix effectively eliminates requirements Nos. 2 and 6 (cf. supra) from the criteria for the ceramic employed, such that currently available ceramics materials which adequately meet the other requirements and thus can withstand reasonable duration of operation at 2500° F. in contact with rapidly moving air streams, for example silicon-bonded silicon carbide bodies, may be used. Furthermore, the neutron moderating efficacy of water in liquid state is amply superior to that of neutron moderants available in ceramic form that the volumetric neutron moderating efficiency of the insulated water, taking into account the extra volume occupied by the insulation, is still sufficient—despite the large surface areas per unit volume requiring thermal insulation in the case of its fine-structured openwork matrix configuration—to afford an aircraft-powering reactor of which the ceramic heat-transferring surfaces need not be more than 2500° F. for effective aviation of the same. Too, it has further been found that, in addition to water, other liquid hydrogenous media, such as liquid deuterium oxide (heavy water), are also applicable in the instant arrangement. Therefore, in accordance with the present invention, an improved neutronic fission reactor core, adapted to provide propulsive power by heating gas flowed in heat-transfer relationship therethrough, comprises an amassed multiplicity of fissionable-material-containing fuel elements adapted to passage of said gas in heat-transfer relationship therethrough; interspersed therebetween metallic structure, adapted to support mechanically said elements; also interspersed therebetween, ducts, adapted to conduct flowing hydrogenous liquid in neutron-moderation relationship with said elements, and in heat-transfer relationship with said structure; thermal insulation adapted to insulate said structure and liquid from said elements; flowing through said ducts, hydrogenous liquid, maintained at an operating temperature substantially lower than that of said elements, to serve as the principal neutron moderant for the core, and as the principal coolant for maintaining said structure at an operating temperature substantially lower than that of said elements; and means for continuously cooling said flowing hydrogenous liquid.

Not only does this manner of core constitution admit of effective operation of the air-heating ceramic surfaces at ca. 2500° F., but, in aircraft-propulsion application, the outstanding volumetric neutron-moderating efficiency of water affords a reactor core of appreciably smaller volume than in the case of one employing a ceramic moderant. Such decrease in core volume is attended by a much greater proportion of decrease in the weight and volume of the entire reflected and shielded reactor assembly, and consequently by the similar reduced weight and volume of airframe and propulsive engines required. The correspondingly reduced propulsive power requirements result in considerable reduction in the necessary operating temperature of the air-heating ceramic surfaces in the core. This effect is somewhat further enhanced by virtue of the lessened necessary intensity of reactor power production which affords some decrease in the thickness of shielding required. As an overall engineering design result, the necessary temperatures for the air-heating surfaces in the core are reduced so far as to approach generally the upper limits of temperatures which common metals of construction can withstand. In such case, applicants have further found, as a further extremely important attribute of the present invention, that by very virtue of employing fuel elements constituted of metal, e.g. stainless steel (encasing e.g. uranium oxide as fuel), instead of ceramic, the increase in permissible air-heating surface area per unit volume of reactor core and general increase in coefficient of heat transfer to air enable the same rate of heat transfer at a sufficiently lower air-heating surface temperature as to reduce the necessary fuel element operational temperature down into the range of 1600 to 1800° F.—which stainless steels are able to withstand. For example, a compact reactor has been fully designed and engineered in this manner, employing an insulated matrix of circulating water and aluminum supporting structure within the core, supporting fuel elements comprising plates constituted of sheets of stainless steel sandwiching U-235-enriched uranium oxide therebetween and metallurgically bonded together, with the bore being encased in a reflector and appropriate shielding. In this reactor, the core, of horizontal right cylindrical configuration, has an effective outside diameter of only 5⅓ feet, and an active length of only 3 feet; the core is encased in a reflector and an adequate core-shielding system having an overall outside diameter of only 10 feet, with the core-reflector core-shielding assembly having an aggregate weight of only 119,000 pounds. Incorporated within the core is a total fuel element heat-transferring surface area of 5,570 square feet. The power production range of the reactor is broad and flexible: coupled with pluralities of modified turbo-jet type gas turbine engines, e.g. four engines of United States Air Force standard designation "J-47-GE-11," the reactor is adapted to heat continuously a mass flow of 238 pounds per second of air, entering at 56 p.s.i.a. and 426° F., to 1400° F. with a maximum fuel element surface temperature of only 1650° F., delivering 7,000 pounds thrust (5,000 ft.; static); alternatively, with four modified engines of United States Air Force standard designation "J-77," the reactor is adapted to heat continuously a mass flow of 663 pounds per second of air, entering the core at 101 p.s.i.a. and 591° F., to 1400° F. employing a maximum fuel element surface temperature of again only 1650° F., delivering 26,000 pounds thrust (15,000 ft.; static). When coupled, for example, with the four modified "J-77" engines, the weight of the overall core-reflector core-shield four-engines assembly is only ca. 133,500 pounds, and together with a crew shield weighing ca. 37,000 pounds, spaced some 60 feet from the reactor, the entire weight of the fully shielded nuclear propulsion plant is only ca. 170,500 pounds. Such propulsion plant readily fits into the fuselage of an airplane in contemporary production bearing the United States Air Force standard designation "B-36-D," with only slight structural modifications of the air frame and with the nuclear-powered jet engines being suspended immediately beneath the fuselage; in addition to the nuclear-powered engines, the conventional chemically-fueled turbo-jet engines in the wings of the "B–36–D," together with a relatively small quantity of gasoline are permitted to be retained. Such arrangement affords a manned nuclear-powered airplane of total weight of only ca. 360,000 pounds—i.e., 180 tons. The 26,000 pounds of thrust provided by the nuclear power plant are independently adequate to sustain flight of such airplane at ca. 300 miles per hour at 15,000 feet altitude, without operation of the chemically-fuelled engines; the chemically-fuelled engines are thus permitted to be retained in dormant reserve for short periods of operation to provide maximum-effort thrust for military emergencies and the like, and to afford added flexibility and safety in take-off and landing maneuvering. Accordingly, the instant improved manner of reactor core construction, by providing a new, different means for circumventing the grave impasse which had been confronting application of air-cycle nuclear propulsion to aircraft, clearly represents a significant advance in the neutronic reactor art.

In more detail, the particular hydrogenous liquid employed as the neutron moderator in applicants' system is subject to wide variation. Normal water is deemed pre-eminent for the purpose. Liquid deuterium oxide (heavy water) is also suitable, and, in fact, liquid deuterium oxide has a moderating ratio, $$\frac{\xi \sigma_s}{\sigma_a} \left( \frac{\xi \sigma_s}{\sigma_a} \text{ for } D_2O = 12{,}000 \right)$$

more than two orders of magnitude greater than that of water $$\left( \frac{\xi \sigma_s}{\sigma_a} \text{ for } H^2O = 72 \right)$$

however the slowing down length, $L_f$ (i.e. the root of one-sixth the mean square crow-flight distance of travel of neutron from point at which it is at fission to point at which neutron becomes thermal) for water ($L_f$ for $H_2O = 5.7$ centimeters) is only ca. one-half that for liquid deuterium oxide ($L_f$ for $D_2O = 11.0$ centimeters). In the present instance, where the water is employed in the configuration of a thin, fine-structured matrix, shortness of slowing down length of the moderator assumes primary significance; nevertheless, in the event of resort to quite large core sizes containing the liquid neutron moderator in much thicker configuration, the importance of shortness of slowing down length of the moderant would recede, whereupon deuterium oxide's greater value of moderating ratio would then assume primary significance, making deuterium oxide preferable for the purpose. Among other liquid hydrogenous moderating media available, liquid organic compounds, especially hydrocarbons, stand out; in any case, the important criteria for this service include high molar hydrogen content per unit volume, as well as high molar content of carbon if present, high heat capacity, and low relative vapor pressure per given temperature. Liquid paraffins, such as liquid octane for example, tend to meet these criteria to a reasonable degree. In the case of use of normal water as the moderator, it has been found that the attendant irradiation-induced reversible decomposition of the water—into gaseous hydrogen and oxygen, as well as some hydrogen peroxide—is practically innocuous when the water employed is of high purity; under neutronic reactor irradiation approximating of the level of $10^{13}$ to $10^{14}$ neutrons per square centimeter per second, the equilibrium pressure imposed by such decomposition has proven to amount to only an added 1.5 to 2 p.s.i.a. Aromatic liquid hydrocarbons, such as alkylbenzenes, being particularly resistant to reactor irradiation-induced decomposition, are also applicable.

The thermal insulation, for the present purpose, should have as low a thermal conductivity as possible, must retain adequate structural integrity at the high temperatures—of the order of 1500 to 2500° F.—involved, should not suffer any significant breakdown of macroscopic structure over extended periods of intense reactor irradiation, and must exhibit a very low neutron absorptivity. Insulation of the silica and alumina base type has been found to afford insulation of thermal conductivity so low as, and lower than, 1 B.t.u. per inch per hour per square foot per degree Fahrenheit at a mean temperature of about 1000° F., and otherwise to meet these requirements adequately. Employing such insulation fabricated in the form of felt has proven particularly convenient and appropriate. Particularly advantageous is an insulating material having a composition of about equal portions of silica and alumina, along with ca. 0.5% ferric oxide, ca. 0.5% titania, ca. 0.2% calcium oxide, and ca. 0.2% alkalis—available under the trade name "Thermoflex R–F"; investigation has revealed that the material, which may be fabricated in felt form, has a thermal conductivity value of only ca. 0.82 B.t.u./in./hr./sq. ft./° F. at a mean temperature of approximately 1000° F., a material density as high as 11 pounds per square foot, and a quite low thermal neutron absorptivity. Investigations have also shown that so little as a ⅛ inch thickness of such material is sufficient, when placed on both sides of a flowing layer of water one inch thick, entering at 220° F. and remaining for a residence time of five seconds, to protect and insulate the same from the heat of adjacent reactor fuel elements operating at temperatures of the order of 1650° F., to limit the temperature increase of the water to only ca. 25° F. At these temperatures, a superatmospheric water pressure of only 60 p.s.i. is adequate to avoid boiling with an ample margin of safety. Various other types of high-temperature-resistant, low-thermal-conductivity insulating materials, for example diatomaceous earth, are also applicable.

For constituting the cooled core-supporting structural members, it is highly desirable that the metal constituting the same have a very low thermal neutron absorptivity. Among common structural metals, aluminum and zirconium are particularly notable in this respect. Both retain structural strength, and thus are serviceable, up to at least 600° F. Both exhibit excellent corrosion resistance to water of high purity up to 300° F.; above this temperature, up to 500 to 600° F., though, only zirconium maintains this excellent corrosion resistance. However, the thermal conductivity of aluminum is roughly ten times that of zirconium. Furthermore, fabrication procedures for aluminum are considerably more familiar in the art, and are very much further advanced, than those for metallic zirconium. Accordingly, for service in the instant arrangement under conditions of being in intimate thermal contact with water of a temperature typically at or below 300° F., aluminum is the particularly preferred species for the structural members. For the same reasons, aluminum is the preferred metal for constituting ducting for containing the flowing water in its fine-structured matrix disposition throughout the reactor core; at water pressures below 100 p.s.i., ducts of sheet aluminum of approximately $\frac{1}{16}$ to ⅛ inch thickness are satisfactory. Toward minimizing the weight and volume of metal required, it is particularly preferred to constitute the structural members of corrugated metal sheet, sandwiched between and bonded to a pair of flat metal sheets, which form the outer walls of the water-conducting ducts; a hollow wall is thus provided, serving simultaneously as a duct means for the moderator water stream flowing through the interior thereof, and as a rigid, internally-trussed hollow plate for serving in the structural support of the core. Beneficially, a multiplicity of segments of such type of hollow wall may be attached to one another in a honeycomb-like or other array, with all free edges being sealed to prevent the effusion of the contained water, so as to form a rigid matrix of the same forming a multiplicity of fuel-element-supporting surfaces; the resulting matrix serves to partition the interior of the reactor core into a laterally-clustered multiplicity of parallel, co-extensive, open-ended gas channels wherein fissionable-material-containing fuel elements are disposed and supported, through which the stream of propulsive air, or other gaseous reactor coolant, is passed, in heat-transfer relationship with the fuel elements, to become heated. All exterior surfaces of the hollow metal walls would be sheathed in thermal insulation, and by making the hollow walls mutually intercommunicating, the water stream may readily be circulated throughout the entirety of the interiors of the hollow-wall matrix. In fabricating the hollow walls, a pitch of the corrugations in the corrugated sheet approximating ¼ the thickness of the hollow wall has been found to afford a particularly strong and rigid wall structure from an engineering standpoint. Joining the flat sheets to the sandwiched corrugated sheet by dip-brazing has been found convenient and effective, although other conventional techniques, such as spot-welding or plug-welding, are applicable. Alternatively, similar types of hollow wall, for example one comprising a pair of juxtaposed, spaced, parallel, flat sheets having a multiplicity of spaced webs, integral therewith and extending perpendicularly therebetween, may be produced by extrusion.

Where the fuel elements in the present arrangement are to operate at very high temperatures—i.e., above roughly 1900° F.—they should best be constituted of ceramic material. Various ceramic materials of relatively insignificant neutron moderating efficiency, but which are characterized by ability to withstand very high temperatures up to 2500° F. and above are applicable; among these, applicants prefer alumina-bonded, or silicon-bonded, silicon carbide bodies containing a few percent of the oxide form of the fissionable material selected, as needed. Particularly preferred are ceramic bodies which have been prepared comprising 90% silicon carbide, 8% alumina (or alternatively 8% ball-clay), and 2% uranium dioxide as the fissionable material; production of effective ceramic bodies of the same has been conducted by admixing finely comminuted powders of the components, and compacting the same by standard hot pressing, or cold pressing techniques. For example, employing the composition comprising 8% alumina, ceramic tiles approximately 1 inch by 3 inches and 0.050 inch thick were successfully prepared by hot pressing at 3720° F. for one hour at 5,000 pounds per square inch pressure; these are adapted to be employed in stacked, parallel, co-extensive array, spaced about ¹⁄₁₀ inch apart, through the interspaces between which the propulsive air is passed to be heated. Alternative successful preparations by cold pressing, employing the 8% ball clay composition, has involved compacting by cold pressing at 50,000 p.s.i., followed by sintering at 2500° F. for 2 to 3 hours. Other effective ceramic bodies include blocks of approximately 4 inches by 4 inches cross section perforated, over the entirety of their cross section, with parallel holes of ca. ¼ inch diameter located on approximately ½ inch triangular centers, prepared by standard techniques. Furthermore, where the operating temperature of the fuel elements is not so high as to practically preclude the same, important added advantage derives from employing ceramic materials in the fuel element bodies which have high volumetric neutron moderating efficiencies; this, of course, contributes to the accomplishment of the neutron moderation task, and thus tends to reduce further the necessary size of the reactor core. For example, dense ceramic tiles have been prepared by hot pressing mixtures of approximately 2% uranium carbide and the remainder beryllium carbide and graphite in approximately 70% to 30% ratio, of size 2⅞ inches by ⅝ inch by ¹⁄₁₀ inch, and coating with conventional ceramic glazes comprising silica, alumina, and alkali and alkaline earth oxides approximating 0.001 inch thick; these are spaced apart, at again about ¹⁄₁₀ inch spacing, are readily bonded to spacers simply by fusion of the coating at its maturing temperature of 2000° F., and, in general, are applicable for fuel element operational temperatures of 1800 to 1900° F. and below.

For operational temperatures of 1800° F. and below, fuel elements affording metal surfaces for transferring heat to the propulsive air streams are especially advantageous. Fuel element plates of this nature are preferably formed by sandwiching and metallurgically bonding a compact, formed by standard powder metallurgical techniques, of comminuted uranium oxide and a metal, between two metal sheets, with all free edges being sealed to prevent escape of fissionable material or fission products. A variety of metals, especially the stainless steels which can adequately withstand temperatures as high as 1800° F., are applicable; particularly preferred is 25–12 stainless steel (i.e., alloy of: Fe; ca. 25% Cr; ca. 12% Ni; ca. 0.2% C). Metal fuel plates so prepared have been successfully rolled to as thin as 0.008 inch; fuel plates approximating 15 mils thickness—0.005 inch stainless steel outer sheets plus a 0.005 inch thick enclosed central compact—have proven eminently satisfactory from both nuclear and structural standpoints. Such metal fuel plates are readily fabricated into multi-plate fuel elements. Pluralities of such fuel plates may be affixed to one another, in the manner of conventional radiator-core assembly, so as to define a cluster of parallel air passages through which the propulsive air may be passed in intimate heat transfer relationship with the surfaces of the fuel plates. Simply, such assemblies may comprise stacks of predominantly smooth and predominantly corrugated fuel plates, stacked in consecutive alternation, wherein the corrugations, extending parallel to the direction of air flow, serve to maintain the fuel plates spaced apart to permit air flow therebetween. However, it has been experienced that relatively large, smooth, fuel element surfaces undergo considerable thermal expansion upon being heated from room temperature to high fuel element operational temperatures, leading to warping and buckling resulting from the restraint upon free lateral expansion imposed by the corrugated plates affixed thereto; to avoid this, it has been found particularly beneficial that all such predominantly smooth fuel plates be provided with at least a few periodic longitudinal corrugations to absorb the lateral expansion innocuously by flexure. Too, it has been experienced that regions of contact of the apices of the corrugations of one fuel plate with the surface of the next successive fuel plate in the stack tend to suffer serious overheating as a result of the reduction in flow of air per unit area of fuel element surface which occurs in those constricted regions; toward overcoming this, it has been found desirable that the fuel plates be spaced apart somewhat in these regions, preferably by narrow, fissionable-material-free stainless steel fins affixed perpendicularly between the fuel plates. Accordingly, the particularly preferred metal fuel element comprises a stack of longitudinally corrugated metal fuel plates joined together in co-extensive, spaced-apart relationship by fissionable-material-free spacers.

The particular geometric configuration of the insulated moderant-structural matrix is subject to wide variation. From the standpoint of effectively supporting, positioning, and anchoring the fuel elements, it is preferred that the matrix should generally represent a system of shelves upon which the fuel elements may be individually disposed. For example, the matrix may well define a honeycomb of parallel, horizontal, co-extensive, open-ended tubular passages, of square or rectangular cross section, within which the ceramic or metal fuel elements are placed with their air-flow perforations aligned parallel to the passages; the propulsive air, thereupon simply passes into one face of the honeycomb-like matrix, through the flow perforations of the fuel elements disposed in the tubular air-passage of the matrix, and leaves the core through the opposite face thereof. As a more advanced configuration, particularly preferred for affording enhanced nuclear, thermodynamic, and geometric symmetry, applicants prefer a configuration comprising a plurality of nested, horizontal, concentric, cylindrical, co-extensive, spaced-apart, insulated moderant-structure "shelves," with the fuel elements being disposed in the parallel concentric cylindrical annuli therebetween; for accommodation within the annuli, the block-like fuel elements are shaped to conform to segments of circular arcs. The provision of mechanical guides and brackets upon the shelves defined by the insulated matrix, in order to anchor the individual fuel elements firmly, but flexibly in order to permit adequate thermal expansion, and further which admit of ready removal and replacement of individual fuel elements, have been found highly advisable.

Quantitatively, the preferable amounts—relative and absolute—of the various constituents in the instant core system are generally dictated by a careful optimization between conflicting nuclear and thermodynamic desiderata. First, concerning the proportion of the core volume devoted to air passages, it is recognized, from a nuclear standpoint, to be desirable that the proportion of core volume devoted to air passages be as small as practicable in the interest of achieving small size and bulk of reactor core; on the other hand, from a thermodynamic standpoint, it is recognized to be desirable that the proportion of core volume devoted to air passages, and hence the cross-sectional air flow area, be as large as practicable, in the interest of reducing pressure drop of the air flowing through the reactor, and thus achieving maximum propulsive power per unit mass flow of air through the reactor core. Upon striking a balance between these divergent demands—preferably on the basis of striving to achieve maximum propulsive power per unit volume of reactor core—it has been experienced that the optimum proportion of core volume devoted to air flow will usually fall within the range of 25 to 35% in cases where fuel elements in ceramic form are employed, and within the approximate range of the 35 to 60% for the case of fuel elements in metal form.

Similarly, in the remaining portions of the reactor core, it is desirable, from a nuclear standpoint, to avoid and eliminate as much as practicable of neutron absorptive materials associated with the fissionable material, in the interest of mitigating fruitless absorption of neutrons within the core, and thus of reducing the core size and mass of fissionable material required. This is particularly true in the case of metal fuel elements comprised of stainless steel, as aforementioned, wherein stainless steel has a macroscopic thermal neutron absorption cross section, $\Sigma a$, so high as ca. 0.25 square centimeter per cubic centimeter. From a thermodynamic standpoint, however, very large heat-transferring surface areas of the fuel plates are demanded in order that the required fuel element temperature need not be in excess of those which the stainless steel can structurally withstand. Determined largely by the minimum thickness of the fuel element plate considered mechanically satisfactory—rather closely approached by the range 0.010 to 0.015 inch—the balance indicates the range for the gravimetric ratio of stainless steel to uranium-235 to be approximately 10 to 13 pounds stainless steel per pound of U-235, with 11¾ pounds stainless steel per pound U-235 representing the apparent practical optimum.

For adequate moderation of neutrons, to achieve propagation of the fission reaction predominantly by neutrons of thermal energy, and thus obtaining the sizeable benefits of reduction in critical mass afforded thereby, a ratio of moderant to fissionable material equivalent to at least something of the order of 100 moles water per mole of uranium-235 is appropriate. As for the distribution of the discrete regions of insulated water matrix throughout the system of air-heating fuel elements, as close an approach to thorough homogeneity as practicable would, in the case of isolated fissionable isotope as the fuel, be most efficient from a strictly nuclear reaction standpoint. That is, the macroscopic thermal neutron absorption cross section, $\Sigma a$, of water is by no means insignificant ($\Sigma a$ for water=0.0215 cm.²/cc.) and hence the water itself engages in adverse parasitic capture of thermal neutrons; in general, the greater degree of heterogeneity, the greater will be the probability that a neutron will suffer such parasitic capture in the water rather than fission-inducing absorption in the fissionable material. As a further nuclear limitation to employing any great degree of heterogeneity, it has been found that proceeding to thicknesses of moderant much greater than approximately the root of the mean square crow-flight distance of neutron travel through the moderant from the point at which it possesses fission energy to the point at which the neutron becomes thermal in the medium, $r_t$ ($r_t$ for water=14 centimeters) commences to become especially inefficient; greater thicknesses of moderant contribute little further beneficial service in moderating incident neutrons of fission energy, while the greater thicknesses do disadvantageously increase the extent of fruitless parasitic capture of thermal neutrons in the moderant and otherwise unprofitably take up valuable space in the core. On the other hand, it would be desirable to employ a disposition of the liquid moderant presenting as small a surface area per unit volume—i.e. as great a degree of heterogeneity—as practicable, in order to limit the expanse, and thus the total volume, of space-consuming, neutron-absorbing insulation needed within the core. Upon striking a balance between these requirements, it is considered that, for liquid water as the moderator, disposition in layers ca. 1 inch in thickness is the apparent optimum; this serves to afford a reasonably small surface area per unit volume of the moderant without seriously approaching thicknesses of the order of $r_t$. In the case of the particularly preferred cylindrically symmetrical core configuration, this is accomplished by making each of the concentric spaced-apart moderant cylinders approximately one inch in uniform water thickness.

Concerning the disposition of the air-heating fuel elements relative to the insulated liquid moderant matrix, it is highly advantageous that the rate of thermal energy production per unit surface area of each discrete fuel element be substantially uniform throughout the reactor. In this way, the power production task is distributed evenly upon all fuel element surfaces, and serves to avoid the adverse occurrence of excessively high temperatures and excessively great rates of fuel burn-up at scattered localized regions in the fuel element array. Too, it is particularly efficient for all increments of the air stream leaving the reactor core to have attained a substantially identical temperature, in order for a maximum flow of air to be heated to a given high average temperature with a given area of air-heating surfaces operating at or below a specified maximum allowable operational temperature. To achieve this, in a case where all air-passages through the reactor core are parallel, co-extensive, and unidirectional, it is preferred that the hydraulic radii of the air passages through the fuel elements be substantially identical over any lateral cross-sectional area of the reactor core—i.e., cross sectional area taken perpendicular to the direction of air flow. In this way, identical hydraulic radii impose a uniform resistance to air flow across any lateral cross section of the core, thereby affording uniform mass flow of air through all passages as an overall result; with the uniform average thermal energy production per unit surface area throughout each discrete fuel element, the degree of heating of each increment of air flow will be the same across any lateral cross-section of core. Achieving such uniform average thermal energy production per unit surface area through each discrete fuel element, though, is not entirely straightforward. Toward achieving this, it is noteworthy that the rate of thermal energy production in a fuel element at any location is precisely proportional directly to the rate of fission in the contained fissionable material at that location; in turn, in a thermal reactor, the rate of fission in a given increment of fissionable material is proportional to the level of thermal neutron flux to which that increment is subjected. Therefore, it is advantageous, in any particular lateral cross section of the reactor core, for each of the individual sections of the discrete fuel elements, all composed of fuel plates having the same content of fissionable material per unit air-heating area at that lateral cross section, to have the same average level of thermal neutron flux coursing therethrough. However, in any critical amassment of fissionable material engaged in a self-sustaining chain fission reaction at equilibrium, the neutron flux throughout the amassment will normally assume a high level in the proximity of the center of the core and gradually decrease toward the periphery, as the result of the continual escape and loss of neutrons at the periphery. Typically, even with a reactor core jacketed with an effective neutron reflector, the average level of total neutron flux at the periphery may approximate only one-third the level at the center of the amassment. This gradual decrease normally obtains not only in the level of the aggregate flux of neutrons of all energies in general, but in the level of the thermal neutron flux in particular. To attain a laterally constant average thermal neutron flux in all fuel elements despite this peripheral decrease in thermal neutron flux level, resort is conveniently made to the occurrence that, in a heterogeneous distribution of fuel elements and moderant, the thermal neutron flux level dips considerably in proceeding from the ambient thermal neutron flux level at the exterior of the finite-size fuel element to its center. That is, in proceeding from the edges and toward the center of the fuel element, the thermal neutron flux is progressively decreased parabolically by absorption in the outer layers; while neutrons are generated copiously within the fuel element, they are generated at the very high fission energy level, and, in the absence of adequate local moderant within the fuel element, tend to migrate out of the fuel element without becoming thermalized, thereupon not immediately contributing substantially to the thermal neutron flux at the center of the fuel element. Significantly, the thicker the fuel element, between the layers of insulated liquid moderant, the greater is the dip in thermal neutron flux across the element. Therefore, within reasonable limits, it is possible to decrease the average of the thermal neutron flux to which the aggregate of the fissionable material in a fuel element is subjected down to whatever level may be desired by simply enlarging the thickness, and concomitantly the fissionable material content, of the fuel element, between adjacent moderant layers. Accordingly, it is preferred, across every lateral cross-section of the reactor core, to utilize fuel elements relatively large in their dimensions between proximate moderant layers in the central portion of the particular lateral cross section of core, and fuel elements of progressively smaller corresponding size toward the periphery, thereby achieving substantially the same average thermal neutron flux—and therefore the same average thermal energy production—in all fuel element sections in that lateral cross section of the core. At least in the case of metal fuel elements, the high thermal conductivity of the fuel plates tends to cause all portions of each fuel element to approximate a single temperature, irrespective of the variation in fission rate across the fuel element. In the preferred concentric cylindrical configuration of the reactor core, the radial symmetry affords simple adoption of this fuel-element size-variation measure by merely decreasing the thickness of the fuel-element-containing annuli in proceeding from the center to the periphery. The absolute thickness of each annuli, in such case, is then governed by the pre-selected overall proportionation of moderant to fissionable material for the entire core, and by the adopted thickness of ca. one inch for the water-filled moderant cylinders. In a somewhat broader sense, such decrease in the thickness of successive fuel annuli while retaining a constant thickness of the moderant cylinders, in proceeding toward the core periphery, simply constitutes radially increasing the local moderant-to-fissionable-material ratio; the resulting radially increased proportion of local core volume being devoted to neutron moderation serves to increase radially the local ratio of thermal neutron flux to total neutron flux to such an extent that the thermal neutron flux is maintained essentially constant radially although the total neutron flux itself progressively decreases radially.

In much the same maner, it is appropriate to attain a uniform thermal energy production rate per unit area of fuel plate longitudinally along the direction of air flow. Posing a similar problem, the thermal neutron flux normally decreases progressively from the center of each air passage through the core toward the axial extremities thereof. It is preferred to compensate for this, maintaining the same mass of fissionable material per unit longitudinal length, by varying the area of air-heating surface per unit longitudinal length directly with the relative thermal neutron flux locally occurring. In this way, the resulting lower air-heating surface area toward the axial extremities corresponds exactly with the lower local thermal neutron flux occurring in those regions, and since the mass of fissionable material per unit length remains fixed, the rate of thermal energy production per unit air-heating surface area is rendered longitudinally constant. In the preferred concentric cylindrical core configuration, this measure is conveniently approximated by dividing the longitudinal length of the reactor core into a plurality of contiguous stages, and varying proportionately the total area of fuel element plates per annulus in each stage. Upon so decreasing the total area of fuel plates toward the axial extremities, it becomes appropriate to increase correspondingly the content of fissionable material per unit air-heating area therein, in order to maintain the same total mass of fission material per unit volume between the water layers throughout the length of each respective fuel-element-containing annulus. Although the hydraulic radii of the air-heating passages in the fuel elements are consequently varied longitudinally in applying this measure, they are varied identically in all air-heating passages in the core, so that the specific resistance to air flow remains constant across any lateral cross-section of the reactor core.

It is highly beneficial that the reactor core be jacketed by appropriate neutron reflectant to serve in mitigating escape and loss of neutrons from the chain reactive amassment. In the event that the neutrons escaping from the core are predominantly of thermal energy, materials such as natural water, deuterium oxide, beryllium, beryllium oxide, graphite, or the like are suitable for the purpose; beryllium metal, perforated by water stream passages, to afford cooling of the reflector, is deemed particularly practical. On the other hand, in the event that the neutrons escaping from the core are predominantly in epithermal energy range, an admixture of a heavy metal, such as iron, together with a thermal neutron reflectant such as mentioned immediately above, is efficient; a 50% to 50% by volume assemblage of iron and water, with at least a portion of the water flowing in heat-transfer relationship with the iron to cool the same, is particularly preferred. In either event, a thickness of reflectant approximating a half foot appears to be the practical optimum.

The particular weight of fissionable isotope needed for achieving criticality of a chain reacting amassment in the form of the instant reactor core arrangement varies with the parameters generally affecting the rates of consumption and loss of neutrons from the amassment. These parameters include size and geometry of the core, identity and nuclear properties of all core components, the presence and extent of impurities therein, the relative volume of the air passages perforating the core, the ratio of stainless steel to fissionable material where such metal-type fuel elements are employed, the identity of the liquid neutron moderant and the proportion of the same with respect to fissionable material, the degree of approach to homogeneity of distribution of moderant and fissionable material throughout the core, the volume and total neutron absorptivity of the thermal insulation employed, the presence and characteristics of any reflector, the presence and nature of other materials proximately surrounding the amassment, and the like. Such mass is quite accurately calculable, though, on the basis of known and accepted nuclear engineering theory. Typically, for example, for a core geometry of a right cylinder of diameter-to-length ratio approximating 1.8:1, highly enriched U–235 as the fissionable isotope, normal water as the neutron moderant, ca. 45% relative volume of air passages, a ratio of stainless steel to U–235 of ca. 12:1 by weight, a proportion of water to U–235 of 7.5:1 by weight, moderant disposition in the form of concentric cylinders ca. 1 inch thick, thermal insulation ⅓ inch thick essentially comprised almost entirely of equal parts of silica and alumina, and reflectant circumferentially jacketing the core comprising equal parts by volume of iron and water of ca. 6 inch thickness, a core volume of the order of 65 to 70 cubic feet and a mass of U–235 of ca. 160 pounds would be adequate to provide a practically effective critical mass.

Upon thus providing a system susceptible to controlled chain fission reaction, it becomes appropriate to interpose a means for controlling the reaction rate—for example, the familiar rods, tubes, or plates comprised of highly voracious thermal neutron absorptive material, such as cadmium or boron, adapted to be adjustably inserted into the core for setting and maintaining the neutron flux level, and concomitantly the rate of fissioning, at whatever intensity may be desired. For the instant insulated hydrogenous liquid moderant arrangement, it has been found particularly advantageous for the thermal neutron absorbing members to penetrate the core within the insulated hydrogenous liquid matrix, rather than within the fuel element regions. As the local thermal neutron flux is ordinarily much greater within the moderator regions than within the approximate fuel element regions, the location of the neutron absorbing materials there greatly enhances the efficiency of their function. While hollow thimbles may be provided within the moderant for accommodating the reciprocable neutron-absorptive masses, added benefit derives from omitting the thimbles and permitting the masses to displace liquid moderant upon their insertion into the core; since the reactivity of the amassment varies qualitatively directly with the proportion of moderant present, as well as inversely with the amount of neutron absorber present, the displacement of the lquid moderant accordingly cooperates to increase the effectiveness of the insertion of the neutron-absorbing members. Too, location of the neutron-absorptive masses within the insulated liquid moderant affords beneficial cooling of the same, so that serious difficulties which would ensue upon warping, oxidation, and the like, of the absorber members are largely avoided. In order to avoid disrupting greatly the lateral uniformity of average thermal neutron flux level in the fuel elements, if provided, it is preferred to employ a multiplicity of small adjustably insertable neutron absorptive masses, distributed with more or less lateral uniformity across the entire core, instead of merely a few large masses of the same; use of as many as 25 to 50 neutron-absorptive members, reciprocable largely in unison, has been found to be reasonable and effective.

Protection of any human beings and delicate instruments to be located in the vicinity is afforded by interposing radiation shielding sufficient to reduce neutron and gamma radiation reaching the sensitive entities to a tolerable level. For humans, the upper limit of tolerance for extended periods of exposure, of say 25 to 100 hours— e.g., the duration of a nuclear-reactor-propelled aircraft flight—has been taken to be approximately ¼ roentgen per hour; this is normally divided between the principal reactor emanations, i.e. neutrons and gamma rays, resulting in a specific limitative tolerance of say ⅛ roentgen per hour for neutrons and ⅛ roentgen per hour for gamma rays. More sensitive entities, such as photographic film and certain electronic and radio components, if present, may require even greater protection against the radiation emanated.

A more comprehensive and detailed insight into the present reactor core system is afforded by consideration of the specific design, structure, and materials preferred by applicants. While practice of the present invention in accordance with the foregoing general outline is not limited to any specific design of neutronic reactor, the reactor system illustrated in the appended drawings has been shown to be eminently efficacious for the purpose.

In the drawings:

FIGURE 1 is a partially-disassembled, rear, perspective illustration of an air-cooled neutronic reactor core and reflector assembly, incorporating an insulated hydrogenous liquid moderant and core-supporting structure system, in accordance with the present invention, and embodying the particularly preferred reactor core configuration comprising a nesting of concentric, spaced-apart neutron-moderating and core-supporting cylinders.

FIGURE 2 is a partially-cut-away exploded view of a representative one of the neutron-moderating and core-supporting cylinders of the FIGURE 1 core-reflector assembly.

FIGURE 3 is a perspective assembled view of the FIGURE 2 cylinder.

FIGURE 4 is a perspective, partially-disassembled view of a representative procession of drawers wherein the fuel elements of the FIGURE 1 core-reflector assembly are mounted, affording removable, flexible positioning of the fuel elements within the core.

FIGURES 5 through 9 are enlarged perspective views of alternative designs of fuel elements adapted to be confined within fuel drawers such as shown in FIGURE 4, and to be thus incorporated in the FIGURE 1 core-reflector assembly.

More particularly: FIGURE 5 illustrates a fuel element comprising a stack of alternatively corrugated and flat fuel plates affixed in spaced-apart relationship by fissionable-material-free fins bridging between the apices of the corrugations and the faces of the juxtaposed flat fuel plates.

FIGURE 6 illustrates a fuel element comprising a stack of fuel plates, having longitudinal corrugations formed periodically therein to absorb lateral thermal expansion by flexure, spaced apart by fins.

FIGURE 7 illustrates a fuel element similar to the FIGURE 6 fuel element, but spaced apart by fins having slip joints incorporated therein to facilitate assembly.

FIGURE 8 illustrates a fuel element similar to the FIGURE 6 fuel element, wherein the fuel plates are spaced apart by rivet assemblies rather than fins.

Figure 9:
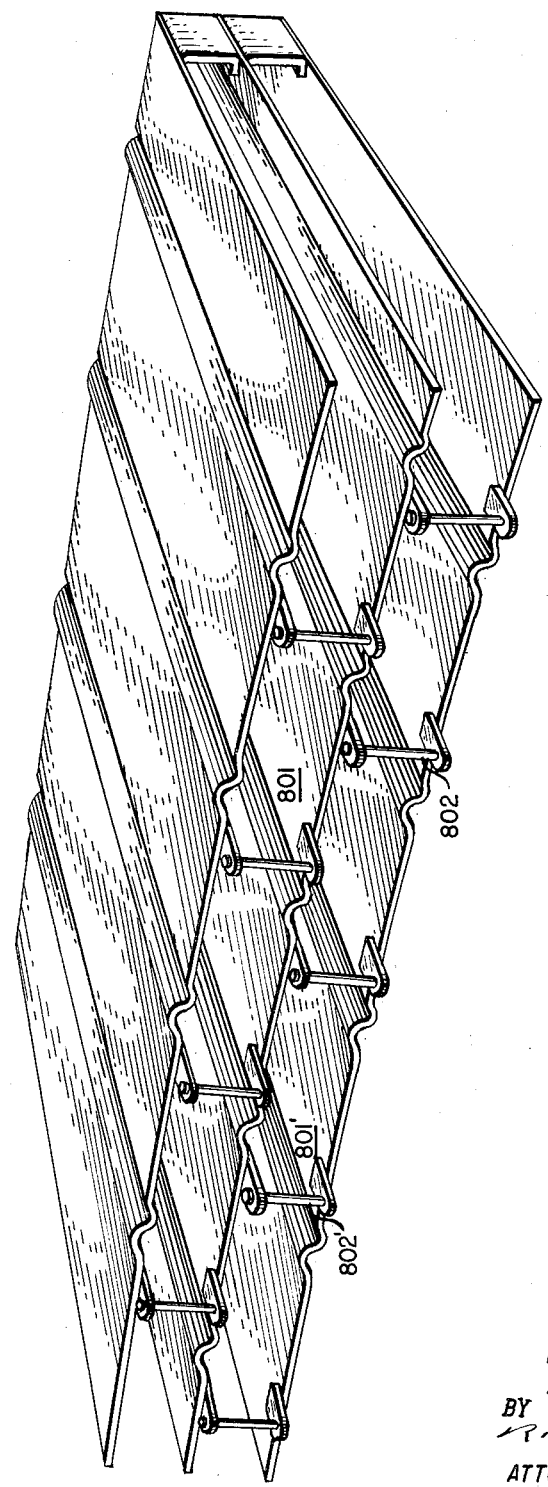

FIGURE 9 illustrates a fuel element comprising a stack of longitudinally corrugated fuel plates spaced apart by flat fissionable-material-free spacer strips.

Figure 1:
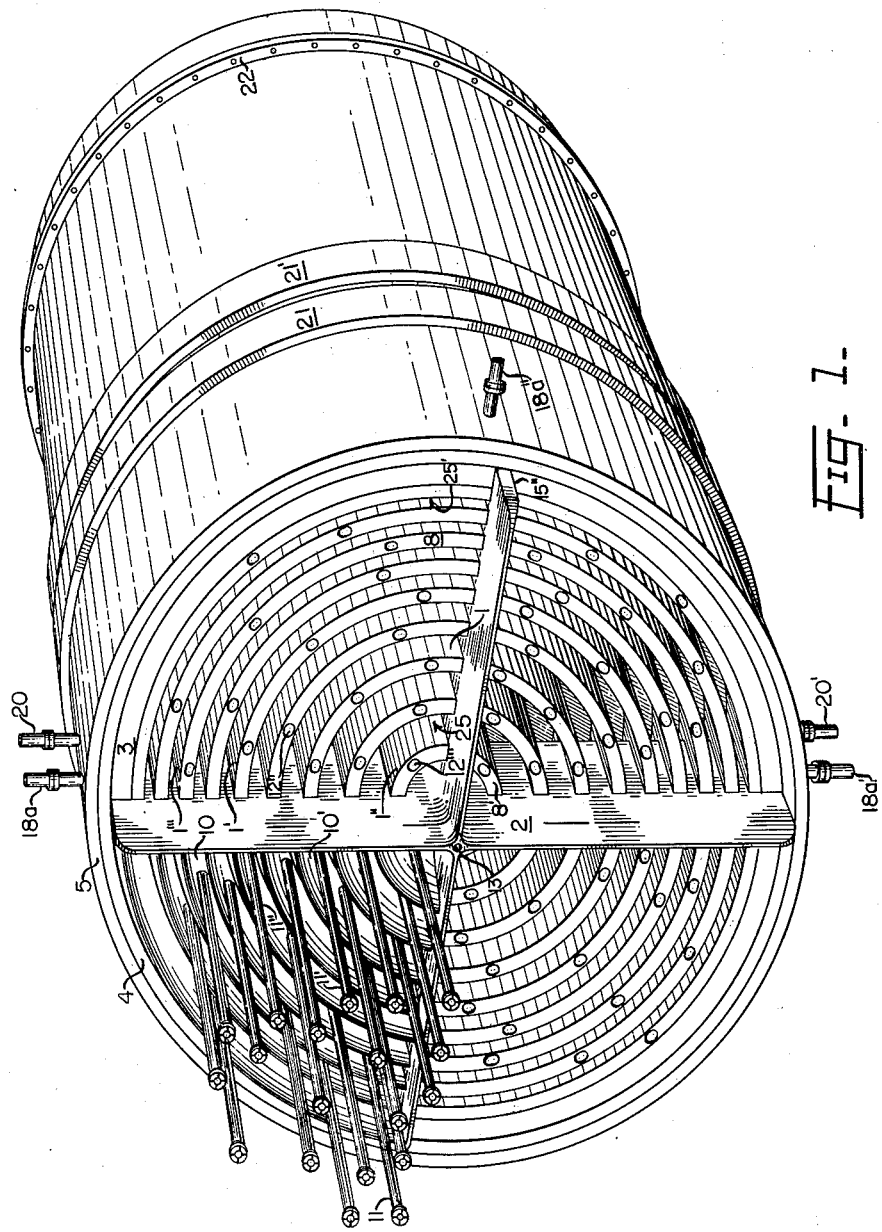
Figure 10:
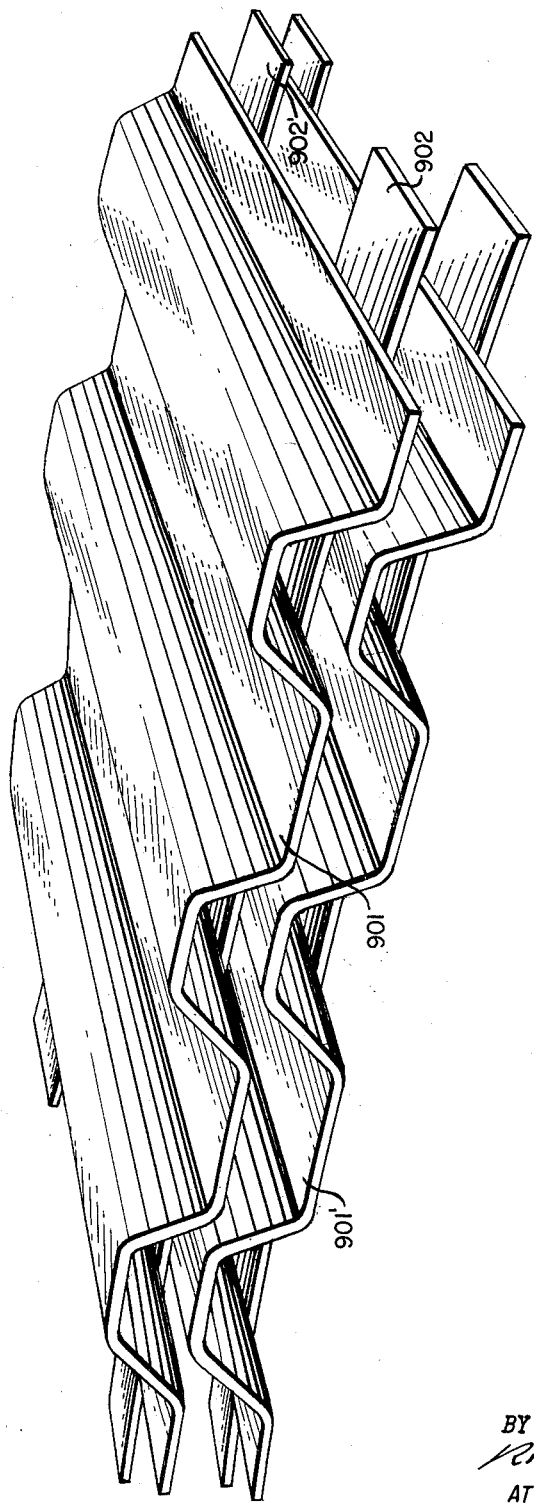

FIGURE 10 is an exploded, partially-cut-away, perspective view of a circumferential shield tank assembly, adapted to have the reactor-core assembly shown in FIG-1 mounted therewithin, and further adapted to contain circumferential radiation shielding as a jacket around the FIGURE 1 core-reflector assembly.

Figure 11:
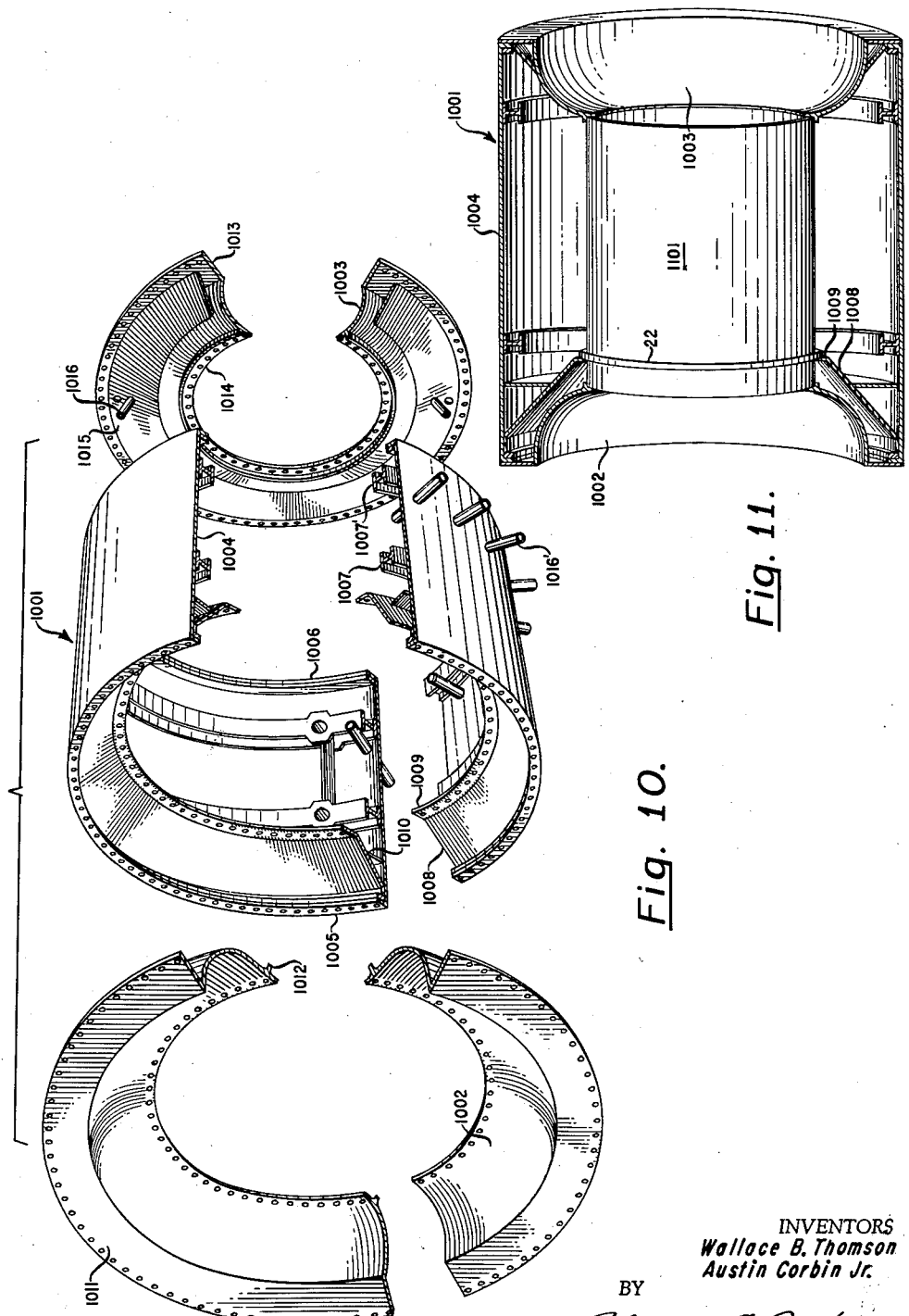

FIGURE 11 is a partially cross-sectioned view of the

FIGURE 10 circumferential shield tank assembly, assembled and containing the FIGURE 1 reactor core-reflector assembly mounted therewithin.

Figure 12:
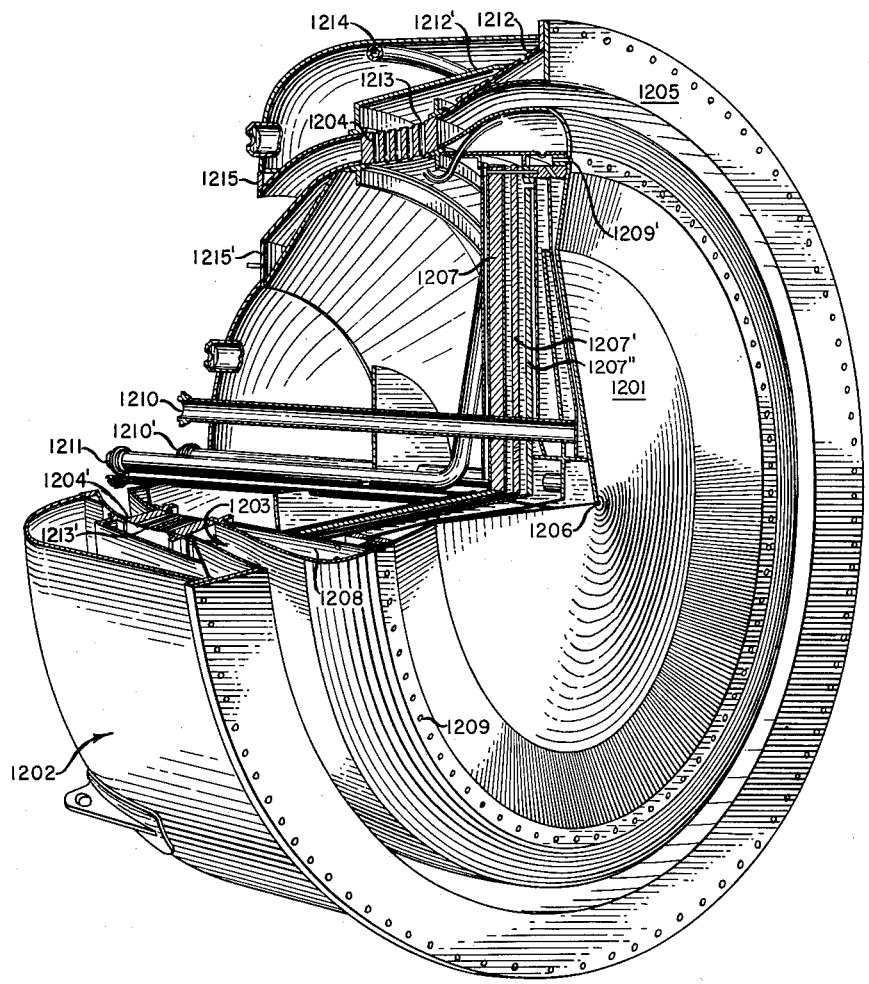

FIGURE 12 is a partially-cut-away, perspective, rear view of a forward shield assembly, adapted to be attached to the forward extremity of the circumferential shield tank assembly shown in FIGURES 10 and 11, to provide radiation shielding across the forward extremity of the FIGURE 1 core-reflector assembly, and to provide inlet duct means for ingress of an air stream for passage through the reactor core.

Figure 13:
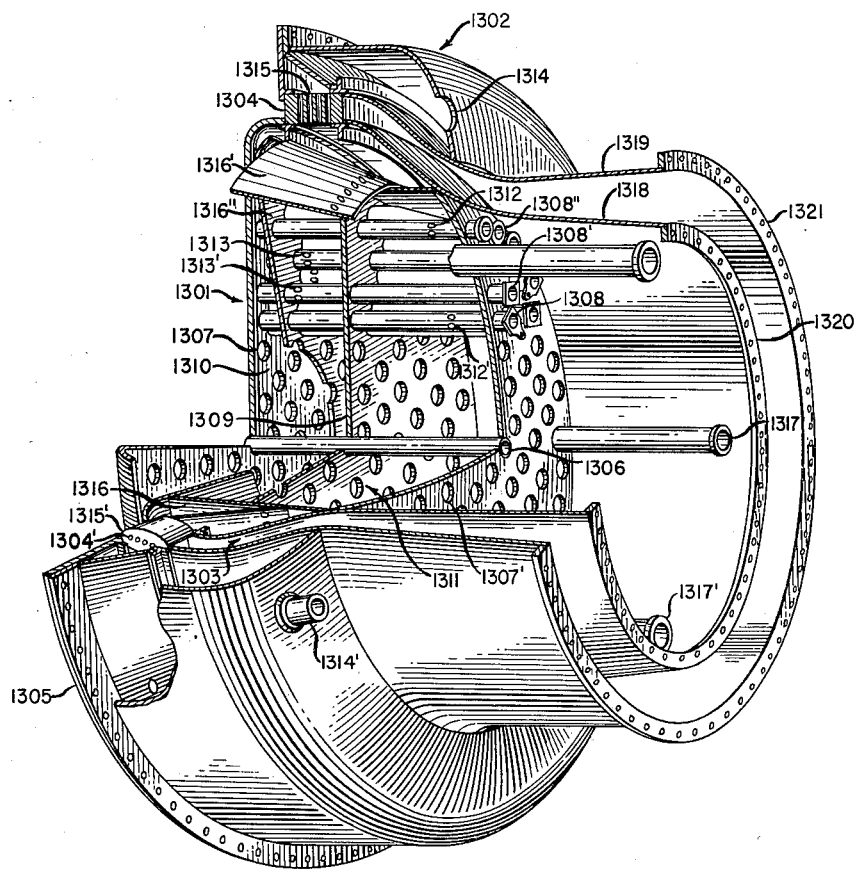

FIGURE 13 is a partially-cut-away, partially-disassembled, rear, perspective view of an aft shield assembly, adapted to be attached to the rear extremity of the FIGURES 10—11 circumferential shild tank assembly, to provide radiation shielding across the rear extremity of the reactor core, and to provide duct means for egress of a heated air stream after passage through the reactor core.

Figure 14:
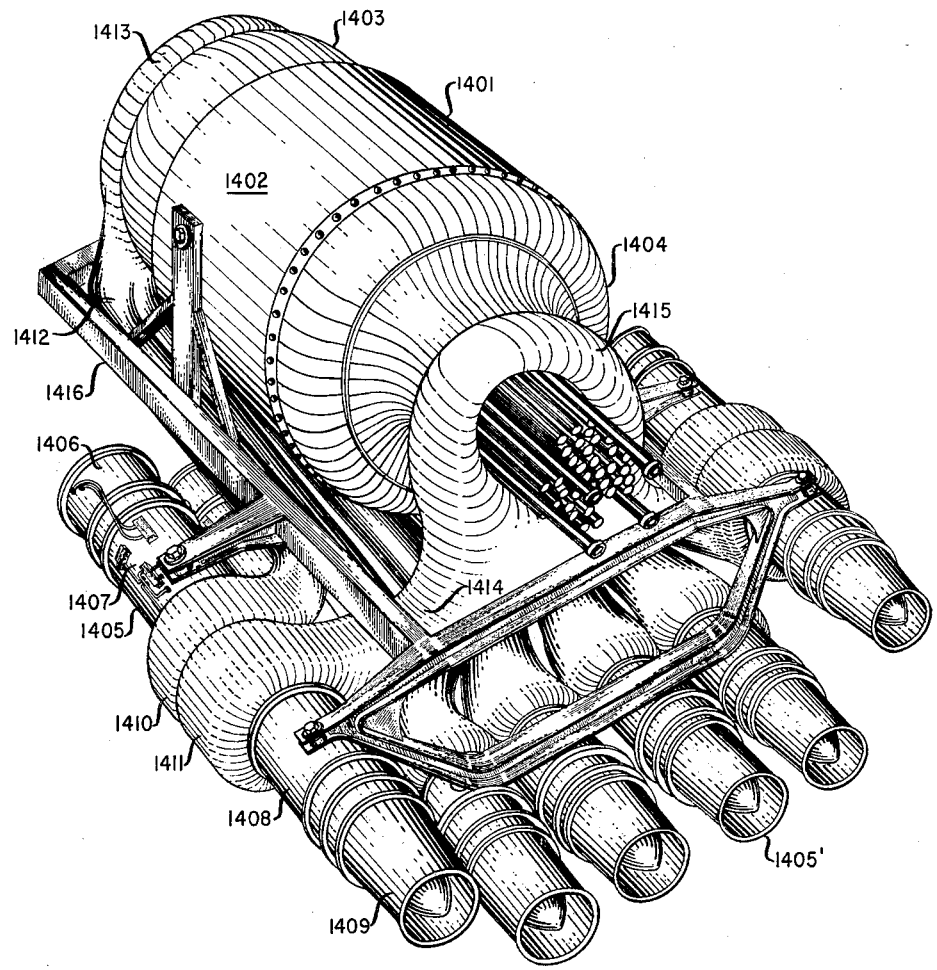

FIGURE 14 is a perspective view of a unitary, compact, air-cycle, aircraft nuclear propulsion plant, wherein the FIGURE 1 core-reflector assembly, mounted within the FIGURES 10—11 circumferential shield tank assembly, having the FIGURE 12 forward shield assembly and the FIGURE 13 aft shield assembly respectively connected to the front and rear faces thereof, is combined through the agency of appropriate air ducting means with a plurality of modified turbo-jet engines.

Figure 15:
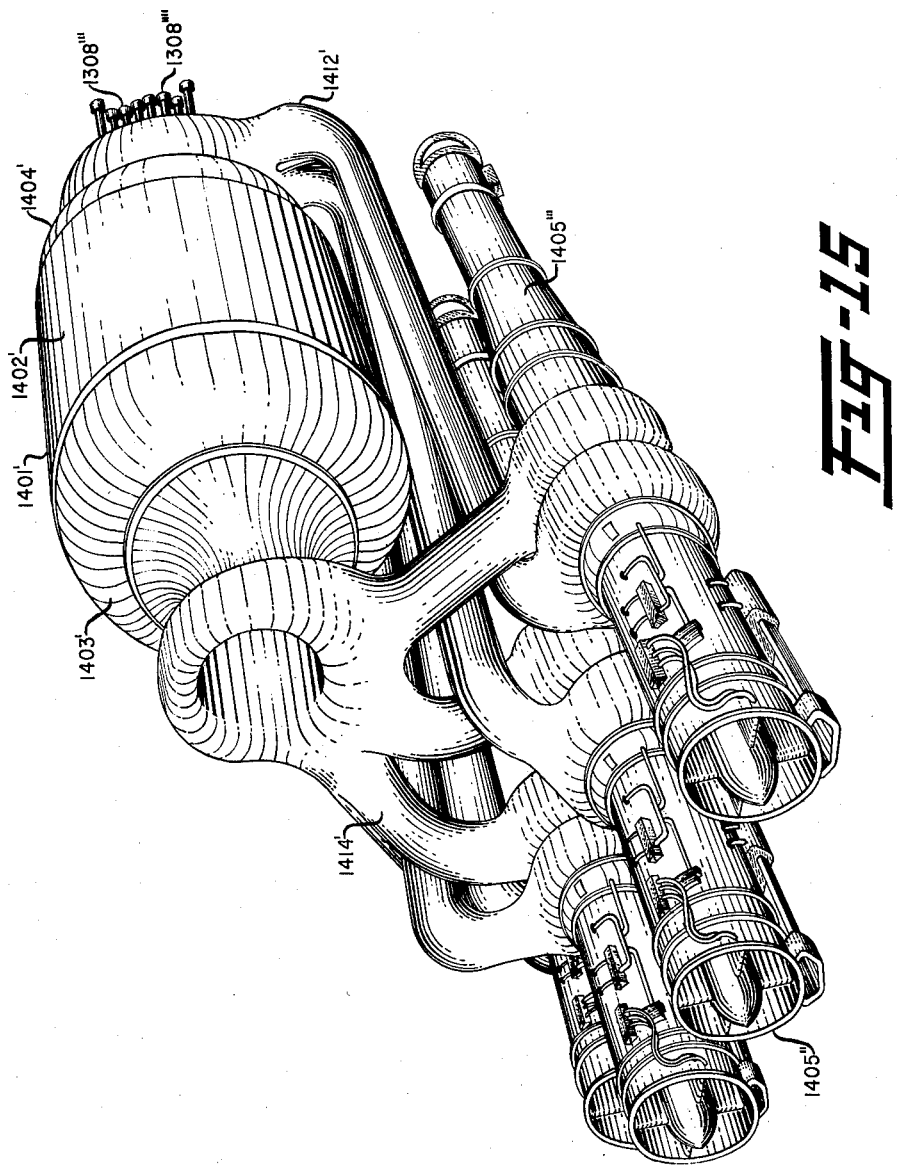

FIGURE 15 is a perspective illustration of an improved air-cycle nuclear aircraft propulsion plant, similar to that illustrated in FIGURE 14, with the principal difference that the reactor is adapted to operate with air flow from rear to front rather than from front to rear.

Figure 16:
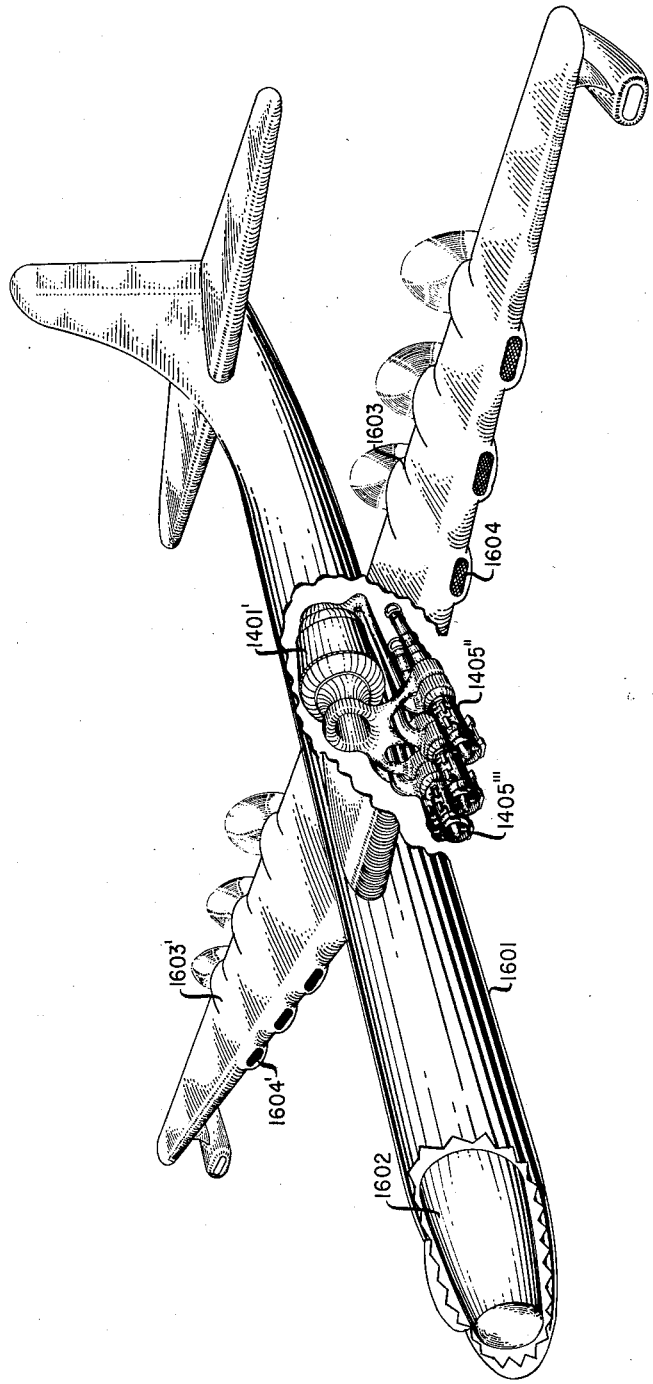

FIGURE 16 is a phantom view of the FIGURE 15 nuclear propulsion plant appropriately installed in the fuselage of an airplane to afford nuclear propulsion of the same.

FIGURE 17 is a longitudinally half-sectioned view of the FIGURE 1 core-reflector assembly.

FIGURE 18 is a transversely sectioned view of that quadrant of the FIGURE 1 core-reflector assembly through which the FIGURE 17 half-section is taken.

FIGURE 19 is a partially cut away, partially-disassembled, detailed, perspective view of a cruciform strut member of the FIGURE 1 core-reflector assembly, shown with a portion of one of the neutron-moderating and core-supporting cylinders mounted thereupon.

FIGURE 20 is a schematic diagram of a water recirculation loop adapted to accept effluent liquid moderant from the FIGURE 1 core-reflector assembly as discharged through the FIGURE 13 aft shield assembly and to cool, pressurize, and pump same to provide a stream of fresh liquid moderant for reintroduction through the FIGURE 13 aft shield assembly into the FIGURE 1 core-reflector assembly.

Referring to the reactor core-reflector assembly illustrated in FIGURES 1, 17 and 18, a plurality of substantially-rigid cylindrical hollow walls 1, 1', 1'', 1''', nine in number, each of a different diameter, but of uniform thickness, are nested in concentric, horizontal, spaced-apart, co-extensive disposition. At the left-hand (i.e., to the left in FIGS. 1 and 17) extremity of the nesting, each of the cylindrical walls 1, 1', 1'', 1''', is rigidly mounted upon a cruciform strut 2, and extends horizontally therefrom in the manner of a cantilever beam without further support. The entire nesting is surrounded by a concentric, co-extensive neutron-reflector shell, comprising, in outwardly-progressing order, a closed, annular, cylindrical reflector water tank 3, and a snugly superposed pair of concentric steel reflector shells 4, 5. The cruciform strut 2, is stationarily affixed, at the extremities of its arms, to the steel reflector shells 4, 5. A representative cylindrical hollow wall 1''', comprises a longitudinally-corrugated sheet aluminum cylindrical shell 6, sandwiched between, and bonded to, a pair of smooth sheet aluminum cylindrical shells 7, 7' concentric therewith. The cylindrical shells 7, 7', are closed at their extremities by solid-aluminum, ring plugs 8, 8', 8'', 8''', which are disposed between, and bonded in liquid-tight-relationship with, the smooth cylindrical shells 7, 7'. So constituted each cylindrical hollow wall 1''', is adapted to conduct a flow of pressurized water through the longitudinal, tubular water ducts formed by the depressions between the corrugations in its cylindrical shell 6; in order to divert the water flow reaching one extremity of the cylindrical hollow wall 1''', back through different ducts formed by the different corrugations in the corrugated cylindrical shell 6, portions of the extremities of the corrugated cylindrical shell 6 are replaced with short segments of perforated, circumferentially corrugated sheet aluminum flow diverter 9. Similar flow diverters 9', 9'', are disposed strategically within and around the extremities of all of the hollow walls, 1, 1', 1'', 1'''. All of the cylindrical hollow walls 1, 1', 1'', 1''', have respective removable air turning vanes 10, 10', extending around the entirety of their left-hand extremities. Influx air turning vanes 23, 23', are likewise provided at the right-hand extremities of the hollow walls 1, 1', 1'', 1'''. A plurality of periodically-spaced control rod introduction tubes 11, 11', 11'', longitudinally penetrate the left-hand extremity of each of the cylindrical hollow walls 1, 1', 1'', 1''', passing through the air turning vanes 10, 10', and the ring plugs 8, 8', there. Ports 12, 12', 12'', 12''', in each of the ring plugs, 8, 8', in each of the left-hand extremities of the hollow walls 1, 1', 1'', 1''', are provided to accept, in liquid-tight relationship, the ends of the control rod introduction tubes 11, 11', 11''. Said ports 12, 12', constitute the mouths of respective control rod housing units 204'', 204''' integral with the corresponding ring plug, e.g., 8, 8', and extending longitudinally a short distance within the associated cylindrical hollow walls 1, 1', in uniaxial registry with the respective control rod introduction tubes 11', 11''. In turn, the control rod housing units 204'', 204''', register with, abut upon, and communicate in uniaxial relationship with respective elongated control rod housing tubes 208', 208'', which extend longitudinally within and to the right-hand interior extremity of the associated cylindrical hollow walls 1, 1'. Each of the resulting in-line control rod housing arrays defines a straight tubular conduit adapted to accommodate one of a multiplicity of solid boron-containing, metal, cylindrical control rods 17a, 17a', 17a''. (In FIG. 17, one control rod introduction tube 11', is shown with its control rod removed for clarity.) The internal cross section of each component of each such conduit array is of pronounced ovality, thereby providing ample dimensional clearance to afford the continuous passage of water therethrough irrespective of the presence of a control rod 17a therein; each control rod housing unit 204'', and all control rod housing tubes 208', 208'', are perforated with a multiplicity of holes 19, 19', 19'', along substantially the entirety of their lengths to afford the passage of flowing water readily into and out of the corresponding cylindrical hollow walls 1, 1'. Passing through the intersection of the arms of the cruciform strut 2, a slender central tube 13, adapted to be filled with flowing water, extends along the axis of the concentric nesting of cylindrical hollow walls 1, 1', 1'', 1''', and terminates in a closed end at the far extremity of the nesting. Within each of the annuli 25, 25' formed between respective pairs of all of the cylindrical hollow walls 1, 1', 1'', 1''', and between the innermost hollow wall 1'' and the slender central tube 13, longitudinal processions of block-like fuel elements 14, 14', 14'' are mounted and disposed side by side around the entire circumferential extent of each of the hollow walls 1, 1', 1'', 1''', and are supported entirely by the same. All fuel elements 14, 14', 14'', are maintained spaced and separated from the respective cylindrical hollow walls 1, 1', 1'', 1''', and slender central tube 13, which border the particular annulus in which they are disposed, by interposed layers of stainless-steel-foil-enveloped thermal insulation 15, 15'. Each of the fuel elements, such as 14, being comprised of longitudinally-corrugated, spaced-apart, circumferentially-disposed, fissionable-material-containing metal fuel plates, admits of ready longitudinal passage of air therethrough to become heated. Thus the reactor core admits of ingress of an air stream into the right-hand extremity of the nesting, through the processions of fuel elements 14, 14', 14" in their respective annuli 25, 25' to become heated therein, and after being diverted radially outwardly, upon effluence from the left-hand extremities of the annuli by the respective air turning vanes 10, 10', disposed about the left-hand extremities of the cylindrical hollow walls 1, 1', 1", 1''', departs from the left-hand extremity of the core in a radially outward direction. At the left-hand extremity of the nesting, to protect the water-conducting member, from the high temperature of the heated effluent air, the entire aluminum cruciform strut 2, air turning vanes 10, 10', and control rod introduction tubes 11, 11', 11", are covered with continuation of the stainless-steel-foil-enveloped thermal insulation 15", 15''', 15''''. Furthermore the strut 2, is provided with a system of internal cooling water passages (shown in FIGURE 19) to afford continual cooling of the same as well as the interiors of the air turning vanes 10, 10'; for this purpose, strut cooling water inlet and outlet tubes 18a, 18a', 18a", communicate with the extremities of the arms of the cruciform strut 2. A reflector tank water tube 20, together with another 20', affords circulation of water through the reflector water tank 3. A pair of reflector shell water headers 21, 21', circumferentially girdle the exterior of the reflector shell, affording ingress and egress of flowing water for passage through a system of water passage slots 24, 24', 24", milled in the facing, contacting surfaces of the reflector shells 4, 5, to cool the same. Also circumferentially girdling the reflector shell 3 is a mounting flange 22, by which the outer reflector shells 4, 5, and with it the entire FIGURE 1 core-reflector assembly may be mounted by bolting to a radial bolting flange 1009 of the circumferential shield tank assembly shown in FIG. 10. The extremities of the steel reflector shells 4, 5, accommodate attachment to the inner edges of a forward concave header 1002, and an aft concave header 1003, of the FIG. 10 circumferential shield tank assembly.

The construction of a representative cylindrical hollow wall 1", of the FIGURE 1 nesting is illustrated, in more detail, disassembled in FIGURE 2, and assembled in FIGURE 3. Referring to FIGURE 2, the cylindrical hollow wall is composed principally of a solid-aluminum sub-assembly 201, and a sheet-aluminum sub-assembly 202. The solid-aluminum sub-assembly 201 consists of: a generally circular, unitary ring comprised of support yokes 203, 203', four in all, positioned ninety degrees from one another; a plurality of perforated control rod housing units 204, 204', in this instance four in number, each having a respective one of a plurality of control rod introduction tubes 11''', 11'''', integral therewith, positioned intermediate the support yokes 203, 203'; and a plurality of solid aluminum spacer plugs 205, 205, positioned throughout the remainder of the generally circular ring. All components of the generally circular ring are welded, in series, to one another. The segments of the resulting ring, between successive support yokes 203, 203', constitute the solid-aluminum ring plugs 8, 8' (shown in FIGS. 1 and 17). Both lateral shoulders of each supporting yoke, e.g. 203, are provided with respective integral support yoke lips 206, 206', to firmly accommodate mating portions of the sheet aluminum sub-assembly 202; each control rod housing unit, e.g. 204, is provided upon both its outside and inside surfaces with respective control rod housing unit lips 207, 207', for the same purpose. The sheet aluminum sub-assembly 202, comprises a longitudinally-corrugated sheet-aluminum cylindrical shell 6', sandwiched between, and bonded to, a pair of smooth sheet-aluminum cylindrical shells 7", 7'''. Within the extremities of the sheet aluminum sub-assembly, segments of the longitudinally-corrugated sheet-aluminum cylindrical shell 6 are replaced by perforated, circumferentially-corrugated sheet aluminum flow diverters 9''', 9''''. Longitudinally extending through the interior of the sheet aluminum sub-assembly 202, a respective control rod housing tube 208, is positioned to register with, and abut upon, the extremity of each of the control rod housing units 204, 204'. A solid-aluminum ring plug 8''' (visible in FIGURE 17) is positioned in the far extremity of the sheet-aluminum sub-assembly 202, between the smooth sheet-aluminum cylindrical shells 7", 7''', and is bonded in liquid-tight relationship thereto. Appropriate cut-outs 209, 209', 209", 209''', in the smooth sheet-aluminum cylindrical shells 7", 7''', are provided to mate with each support yoke, e.g. 203, and each control rod housing unit, e.g. 204, of the solid-aluminum sub-assembly 201.

FIGURE 3 is an assembled view of the same representative cylindrical hollow wall shown disassembled in FIGURE 2. There, the sheet-aluminum sub-assembly 202, is mounted upon, and in liquid-tight relationship to, the solid-aluminum sub-assembly 201, with the edges of the appropriate cut outs 209, 209', 209", 209''', of the smooth sheet-aluminum cylindrical shells 7", 7''', fitted beneath the mating support yoke lips 206, 206', and control rod housing units lips 207, 207'. The support yokes 203, 203', are adapted to fit over the arms of the cruciform strut 2 (shown in FIGURE 1), and to be bolted thereto through support yoke bolt holes 302, 301'.

As detailed in FIGURE 19, the arms of the cruciform strut 2, are provided with integral longitudinal cleats 1901, 1901', to accept the bolting of each cylindrical hollow wall 1'''', thereto. A system of internal passages 1902, 1902', affords continual cooling water flow into the vertical arms through an inlet such as 1903, served by a strut cooling water inlet tube 18a (shown in FIG. 1), and out of the horizontal arms.

Referring to the FIGURE 4 representation of the detail of the mounting of fuel elements in the FIGURE 1 core-reflector assembly, individual block-like fuel elements 14''', 14'''', are contained within respective open-ended, box-like, fuel-element drawers 401, 401', adapted to be disposed in longitudinal procession in the annulus between a representative pair of cylindrical hollow walls 1, 1''''. At each of its extremities the procession is terminated by a respective extremital drawer 402, similar to the fuel element drawers 401, 401', but which contains no fuel elements, provided to afford a calming zone to reduce the propagation to the fuel elements of the aerodynamic turbulence which attends the entrance and exit of the high velocity air stream to and from the annulus. The same edge of each of the drawers in the procession is affixed to a common longitudinal first rail 403; in the proximity of its diametrically opposite edge, each drawer in the procession is affixed to a second common longitudinal rail 404, through a respective spring-like leaf 405, integral with the same side wall of each drawer. The rails 403, 404, are slidably retained by pairs of opposed, continuous guide strips 406, 406', affixed to the cylindrical hollow walls 1, 1'''', bordering the annulus; by longitudinally sliding the rails 403, 404, from beneath the guide strips 406, 406', the rails, along with the fuel element drawers 401, 401', and each extremital drawer 402, are readily removable from the annulus. Respective tabs 407, 407', integral with the rear extremities of the rails 403, 404, serve to limit the inward displacement of the rails 403, 404, to the proper operative position for the fuel elements, while a hook-accepting, apertured, vertical web 408, in the mouth of the near extremital drawer 402, facilitates withdrawal of the entire fuel element procession from the annulus. Each spring-like leaf 405, affords ready, lateral, thermal expansion of the drawers, while slight gaps in the longitudinal spacing between successive drawers permit adequate longitudinal thermal expansion. The substantial space between the drawers and the adjacent cylindrical hollow walls 1, 1'''', admits of the placing therein of snugly-fitting, stainless-steel-foil-enveloped, continuous, longitudinal bats of left-form thermal insulation, e.g. 15, 15' (shown in FIGURE 17).

Structural details of alternative block-like fuel elements (14, 14', 14'', as shown in FIGS. 17 and 18; 14''', 14'''', as shown in FIG. 4), to be contained within the FIGURE 4 fuel element drawers, are set forth in FIGURES 5 through 9. While, in any case, the proper size, curvature, number of fuel plates, and spacing between successive plates, of a fuel element, will vary from annulus to annulus, and from one longitudinal position to the next within each annulus of the FIGURE 1 core-reflector assembly, yet the general manner of construction will remain the same as that illustrated.

The segment of fuel element illustrated in FIGURE 5 comprises a stack of wholly longitudinally-corrugated fuel plates 501, 501', and smooth fuel plates 502, 502', in consecutive alternation. The successive plates are maintained slightly spaced apart from one another by respective longitudinal fissionable-material-free fins 503, 503', each extending from the apex of each corrugation of the corrugated fuel plates 501, 501', perpendicularly to the face to the juxtaposed face of the proximate one of the smooth fuel plates 502, 502'. Through the fins 503, 503', the fuel plates are joined together to form a unitary block-like fuel element, which defines a multiplicity of longitudinal air passages 504, 504', therethrough.

The segment of fuel element represented in FIGURE 6 comprises a stack of fuel plates 601, 601', periodically corrugated longitudinally, spaced apart, and bonded and joined together, by a multiplicity of vertical, longitudinal, fissionable-material-free fins 602, 602'.

The fuel element segment represented in FIGURE 7 is much the same as that shown in FIGURE 6, with the exception that here the fuel plate 701, 701', again periodically corrugated longitudinally, are spaced apart and joined by a multiplicity of two-part, slip-jointed, perpendicular, longitudinal fins 702, 702' which serve to facilitate fabrication.

The fuel element segment represented in FIGURE 8, is much the same as those set forth in FIGURE 6 and FIGURE 7, but here the fuel plates 801, 801', are spaced apart primarily by perpendicular rivet sub-assemblies 802, 802'.

The fuel element segment represented in FIGURE 9 comprises a stack of fuel plates 901, 901', provided with longitudinal corrugations of trapezoidal cross section spaced apart from one another by a plurality of flat, transverse, fissionable-material-free metal strips 902, 902'.

The entire FIGURE 1 core-reflector assembly, is adapted to be mounted within the circumferential shield tank assembly illustrated in partially-cut-away, exploded fashion in FIGURE 10. Referring to FIGURE 10, the circumferential shield tank assembly comprises a circumferential shield tank center cylinder 1001, a forward concave header 1002, and an aft concave header 1003. The center cylinder 1001, comprises an open-ended cylindrical tank shell 1004, provided with bolting flanges 1005, 1006, at its forward end aft extremities, respectively, and is internally strengthened by a pair of circumferential I-beams 1007, 1007'. A frusto-conical mounting plate 1008, extends inwardly from the forward extremity of the tank shell 1004, and is provided at its interior edge with a radial bolting flange 1009; a strengthening web 1010 is disposed between the mounting plate 1008, and the interior of the tank shell 1004. The forward header 1002, which comprises a concavely-dished metal ring, is provided at its outer edge with a bolting flange 1011, adapted to mate with the bolting flange 1005 at the forward extremity of the center cylinder tank shell 1004, and is also provided with a second flange 1012, along its inner edge, adapted to connection to the right-hand extremity of the outer reflector shell 5 (shown in FIGS. 1 and 17) of the core-reflector assembly. The aft header 1003, likewise comprises a concavely-dished metal ring, terminating at its outer edge in a bolting flange 1013, adapted to mate with the bolting flange 1006, at the aft extremity of the center cylinder tank shell 1004, and terminates at its inner edge with a flange 1014, adapted to mate with the left-hand extremity of the outer reflector shell 5 (shown in FIGS. 1 and 17) of the core-reflector assembly. The aft header 1003 is provided with a frusto-conical strengthening web 1015, and circumferential shield tank filling and empty nipples 1016, 1016', are provided both in the aft header 1003, and in the center cylinder 1001.

The FIGURE 10 circumferential shield tank assembly is shown assembled, with the FIGURE 1 core-reflector assembly mounted in operative position therewithin, in partially-cut-away fashion in FIGURE 11. Referring to FIGURE 11, the entire FIGURE 1 core-reflector assembly 1011, is mounted within the circumferential shield tank center cylinder 1001, by bolting of its mounting flange 22, to the radial bolting flange 1009, of the frusto-conical mounting plate 1008. The forward concave header 1002, and the aft concave header 1003, are mounted by bolting to the extremities of the center cylinder tank shell 1004, and to the extremities of the reflector shell of the core-reflector assembly 1101, in operative position. The surfaces of both the forward concave header 1002, and the aft concave header 1003, are adapted to be sheathed in thin-layer, stainless-steel-enveloped thermal insulation (not shown in FIGURE 10).

The forward extremity of the FIGURE 11 circumferential shield tank assembly is adapted to have mounted thereupon a forward shield assembly illustrated in partially-cut-away, perspective fashion in FIGURE 12. Referring to FIGURE 12, the forward shield assembly shown comprises basically a metal inner forward shield tank 1201, circumferentially encircled, in spaced relationship, by a metal toroidal outer forward shield tank 1202, defining an annular air inlet duct 1203, therebetween, and connected together by a plurality of streamlined slender support struts 1204, 1204'. The outer edge of the near face of the outer shield tank 1202, terminates in a bolting flange 1205, which mates with the bolting flange 1011 (shown FIGURE 10), of the circumferential shield tank assembly. The near face of the inner shield tank 1201, in its central portion which is adapted to register across the extremity of the FIGURE 1 core-reflector assembly, is dished conically convexly, with the apex 1206, of the conical dishing being adapted to almost contact the far extremity of the slender central tube 13 (shown in FIGURE 1) of the core-reflector assembly; such conical dishing is provided to afford enhanced distribution of the entering air flow to the several concentric annuli extending through the reactor core. Both the entire near face of the inner forward shield tank 1201, and all surfaces of the annular air inlet duct 1203 are adapted to be sheathed in thin-layer stainless-steel-enveloped thermal insulation (not shown in FIGURE 12). Within the inner shield tank 1201, are transversely mounted a plurality of co-extensive, steel-sheathed lead discs 1207, 1207', 1207'', extending across the entire forward extremity of the core-reflector assembly, 1101 (shown in FIGURE 11), provided particularly to attenuate gamma radiations, as well as to decelerate epithermal neutrons, emanated in the forward direction from the reactor core. The lead discs 1207, 1207', 1207'', are supported by mounting upon a cylindrical web 1208, bolted to the inner shield tank 1201, by a series of bolts 1209, 1209'. A plurality of radiation-determination instrumentation introduction thimbles 1210, 1210', penetrate into the inner shield tank 1201, from its far extremity, pass through steel-sheathed lead discs 1207.

1207′, 1207‴, and terminate just short of the apex of the conical dishing 1206, provided to afford introduction of nuclear radiation-determination instrumentalities into close proximity to the reactor core. Also penetrating the inner shield tank 1201 from its far extremity, a shield water inlet pipe 1211, affords introduction and filling of both the inner shield tank 1201 and the outer forward shield tank 1202 with water—preferably borated—to serve in attenuating neutrons being emanated in the forward direction from the reactor core. A series of webs and perforated baffles 1212, 1212′, as well as perforations 1213, 1213′ in the streamlined slender support struts 1204, 1204′, communicating between the interior of the inner forward shield tank 1201, and the toroidal outer forward shield tank 1202, along with a shield water outlet pipe 1214, afford introduction and circulation of the shield water into all portions of the interior of both shield tanks 1201, 1202. The tortuousness and spatial disposition of the annular air inlet duct 1203, avoids any straight line path of egress of radiation being emanated from the reactor core in the forward direction. The forward extremity of the air inlet duct 1203, is shouldered by bolting flanges 1215, 1215′.

The FIGURE 11 circumferential shield tank assembly is also adapted to have attached to its rear extremity the aft shield assembly illustrated, in partially-cut-away, partially-disassembled, perspective fashion, in FIGURE 13. Referring to FIGURE 13, the aft shield assembly comprises basically an inner metal aft shield tank 1301, circumferentially encircled, in spaced relationship, by a metal toroidal outer aft shield tank 1302, defining an annular air outlet duct 1303 therebetween, and are connected together by a plurality of streamlined slender support struts 1304, 1304′. The outer edge of the far face of the outer aft shield tank 1302, terminates in a bolting flange 1305, which mates with the bolting flange 1013 (shown in FIGURE 10), of the circumferential shield tank assembly. Both the entire far face of the inner metal aft shield tank 1301, and all surfaces of the annular air outlet duct 1303, are adapted to be sheathed in thin-layer stainless-steel-enveloped thermal insulation (not shown in FIGURE 13). Longitudinally passing, in liquid-tight relationship, completely through the center of the inner aft shield tank 1301, a central tube 1306, is adapted to register with, and connect in liquid-tight communication with the slender central tube 13 (shown in FIGURE 1) of the core-reflector assembly, permitting circulation of water therethrough. Both the far and near faces of the inner aft shield tank 1301, are provided with a multiplicity of perforations 1307, 1307′, provided to accommodate the longitudinal passage completely through the inner aft shield tank 1301, of a multiplicity of control rod introduction tube extensions 1308, 1308′, 1308″, adapted to register with, and connect in liquid-tight communication to, the extremities of control rod introduction tubes, e.g. 11, 11′, 11″ (shown in FIGS. 1 and 17), and 11‴ and 11⁗ (shown in FIGURE 2). The interior of the inner aft shield tank 1301, is transversely spanned by a baffle 1309, appropriately perforated to accommodate the passage therethrough of the control rod introduction tube extensions 1308, 1308′, 1308″, which divides the interior of the inner aft shield tank into a forward compartment 1310, and an aft compartment 1311. Half of the number of control rod introduction tube extensions e.g. 1308, registering with each cylindrical hollow wall, e.g. 1′ (shown in FIGURE 1) of the core-reflector assembly, are provided with perforations 1312, 1312′, communicating with the aft compartment 1311; the remaining half of the control rod introduction tube extensions, e.g. 1308′, are each provided with perforations, e.g. 1313, 1313′, communicating with the forward compartment 1310. A plurality of water stream introduction tubes 1314, 1314′, affords continuous introduction of a stream of water into the toroidal outer aft shield tank 1302, filling the same. From there, a plurality of perforations 1315, 1315′, together with a plurality of perforated baffles 1316, 1316′, 1316″, afford passage of the water stream into the forward compartment 1310. From there, the perforations 1313, 1313′, communicating therewith in half of the control rod introduction tube extensions e.g. 1308′, afford passage of the water stream through those extensions e.g. 1308′, on through the control rod introduction tubes, e.g. 11′ (shown in FIGURE 1) and through each of the cylindrical hollow walls, e.g. 1′ (shown in FIGURE 1) in the core-reflector assembly, thereupon exiting through the remaining half of the control rod introduction tube extensions, e.g. 1308, and out the perforations 1312, 1312′, and into the aft compartment 1311, in communication therewith. A plurality of water outlet tubes 1317, 1317′, penetrating the inner aft shield tank 1301, into communication with the aft compartment 1311 thereof, afford final egress of the water stream. The juxtaposed walls of the inner aft shield tank 1301, and the outer aft shield tank 1302, terminate in respective concentric cylindrical appendages 1318, 1319, which substantially extend rearward the annular air outlet duct 1303, defined therebetween; each of the appendages 1318, 1319, terminates, at its rearward extremity, in respective bolting flanges 1320, 1321.

With the FIGURE 12 forward shield tank and FIGURE 13 aft shield tank bolted to the FIGURE 11 circumferential shield tank assembly containing the FIGURE 1 core-reflector assembly, the resulting shielded reactor is adapted to be connected to a plurality of gas-turbine engines, in the manner illustrated, in rear-view perspective fashion, in FIGURE 14. Referring to FIGURE 14, the resulting shielded reactor 1401, comprising the core-reflector-assembly-containing circumferential shield tank assembly 1402, having the forward shield tank assembly 1403, and the aft shield tank assembly 1404, appropriately bolted thereto, has suspended therebeneath a plurality of modified turbo-jet engines 1405, 1405′. In conventional fashion, each turbo-jet engine e.g. 1405, comprises, in order from front to rear, an atmospheric air inlet diffuser region 1406, an axial compressor region 1407, an axial gas turbine region 1408, and a jet nozzle 1409; in place of the conventional combustion tubes, however, the axial compresser region 1407, discharges into a withdrawal scroll 1410, and the gas turbine region 1408, is fed by a delivery scroll 1411. The withdrawal scroll 1410, of each turbo-jet engine, discharges through a respective compressed-air duct 1412, which in turn discharges into a common inlet scroll 1413, which communicates with the annular air inlet duct 1203 (shown in FIGURE 12) of the forward shield tank assembly 1403, and which is connected in air tight relationship thereto through the agency of the bolting flanges 1215, 1215′ (shown in FIGURE 12) at the forward extremity thereof. In much the same manner, each delivery scroll 1411, communicates, throught a respective hot air duct 1414, to a common outlet scroll 1415, with which the annular air outlet duct 1303 (shown in FIGURE 13) of the aft shield tank assembly 1404, is connected in sealed relationship by the bolting flanges, 1320, 1321 (shown in FIGURE 13) provided at the extremities of the appendages 1318, 1319 (shown in FIGURE 13). A supporting frame 1416, affords appropriate mounting of the reactor 1401, and the turbo-jet engines 1405, 1405′. The composite system illustrated in FIGURE 14 represents a unitary nuclear aircraft propulsion plant, and is adapted to be mounted in an airplane (not shown in FIGURE 14) for the purpose, with the shielded reactor 1401, the inlet scroll 1413, and the outlet scroll 1415, disposed within the fuselage of such airplane, and with the turbo-jet engines 1405, 1405′; suspended just below and outside of the fuselage, with the parallel axes of the turbo-jet engines 1405, 1405′, being aligned longitudinally with the fuselage.

The FIGURE 13 aft shield tank assembly is adapted to have its water outlet tanks 1317, 1317', and water stream introduction tanks 1314, 1314', connected to and served by the remote water recirculation loops diagrammed in FIGURE 20. Referring to FIGURE 20, the loop incorporates a water-to-air radiator 2001, a pressurizer 2002 (cf. Nucleonics, vol. 11, No. 6, June 1953, page 30), and a pump 2003, approximately piped together.

The overall operation of the composite nuclear aircraft propulsion plant depicted in FIGURE 14, the details of which are represented in FIGURES 1–13, is as follows. Referring to FIGURE 14, atmospheric air, enters the air-inlet-diffuser-region 1406, of each of the turbo-jet engines 1405, 1405', and is compressed in the axial compresser region 1407 thereof. The resulting compressed air is thereupon discharged into withdrawal scroll 1410, of each engine, from whence it passes through the respective compressed air duct 1412, and into the inlet scroll 1413.

Then, referring to FIGURE 12, the compressed air enters the air inlet duct 1203, between the bolting flanges 1215, 1215', passes through the air duct 1203, whence it reaches the near face of the metal inner forward shield tank 1201. Water—preferably borated—passed through the water inlet pipe 1211, fills both the inner forward shield tank 1201, and the toroidal outer forward shield tank 1202, and, in cooperation with the series of steel-sheathed lead discs 1207, 1207', 1207", affords substantial shielding against neutron and gamma radiations reaching the same.

Referring to FIGURE 11, the compressed-air passes radially inwardly through the interspace formed between the inner forward shield tank 1201 (shown in FIGURE 12), and the forward concave header 1002 (shown in FIGURE 10), and enters the forward face of the core-reflector assembly 1101; the convex conical dishing 1206 (shown in FIGURE 12), on the aft face of the inner forward shield tank 1201 (shown in FIGURE 12) affords enhanced uniformity of aerodynamic distribution of the air flow across the forward face of the core-reflector assembly 1101. The annular interspace external the core-reflector assembly 1101, and within the center cylinder 1001, is filled with water—preferably borated—to circumferentially shield against radiations emanated from the reactor core.

Then, referring to FIGS. 1, 17 and 18, the compressed air entering the right-hand extremity of the core-reflector assembly illustrated, is guided by circumferential air inlet vanes 23, 23', at the right-hand extremity of the core, and passes longitudinally through the concentric annuli defined between the substantially-rigid cylindrical hollow walls 1, 1', 1". Eeach of the nine cylindrical hollow walls 1, 1', 1", is filled with pressurized circulating water, which is introduced through half of the number of control rod introduction tubes 11, 11', 11", communicating with the interior thereof, and is discharged through the other half of such tubes. Pressurized water is also circulated through the reflector water tank 3 by means of reflector tank water tube 20; pressurized water is likewise circulated through water passages in the reflector shells 4, 5, being introduced and withdrawn through the reflector shell water headers 21, 21'. Pressurized water also is circulated through the water passages within the arms of the cruciform strut 2, by means of the strut cooling water inlet and outlet tubes 18a, 18a', 18a"; still further pressurized water is circulated through the slender central tube 13, e.g., with appropriate baffling. By virtue of the functioning of the water, serving as the principal neutron moderant, within the cylindrical hollow walls 1, 1', 1", as well as the functioning of the water-filled reflector tank 3, and the water-cooled steel reflector shells 4, 5, the fissionable material contained within the fuel elements 14, 14', 14", disposed in the annuli, constitutes a critical chain-fission-reactive amassment. The degree of chain reactivity of the same is precisely regulated and set at whatever level may be desired by adjusting the extent of insertion of respective boron-containing metal control rods 17a, 17a', 17a", adjustably insertable longitudinally through a selected number of the control rod introduction tube extensions 1308, 1308', 1308" (shown in FIGURE 13) on through each of the corresponding control rod introduction tubes, e.g. 11, 11', 11", contiguous therewith, and on through corresponding control rod housing units e.g., 204", further contiguous therewith, and on into each corresponding control rod housing tube e.g., 208', still further contiguous therewith; the degree of chain reactivity is, of course, decreased by longitudinally displacing further length of such control rods into the reactor core, and is increased by longitudinal displacement of portions of the length of the control rods outwardly away from the core. Such adjustment is continually made, by a remote conventional neutronic reactor control rod automatic actuation system (not shown in FIGS. 1, 17 and 18) [cf.: Nucleonics, vol 11, No. 6, June 1953, pp. 35–40, et seq., and papers there cited; Nucleonics, vol. 11, No. 2, February 1953, p. 32, et seq.; Nucleonics, vol. 10, No. 11, October 1950, pp. 59–60; The Elements of Nuclear Reactor Theory, Glasstone and Edland, pp. 314–344, et seq., Van Nostrand, 1952; Proc. Inst. Elec. Eng. (London), 100, Pt. I, 90 (1953)] in response to the indications of the radiation-determination instrumentalities (not visible in FIGURE 12) disposed within the instrument thimbles 1210, 1210' (shown in FIGURE 12) in the forward shield tank assembly. As the control rods fit quite loosely within the control rod introduction tubes 11, 11', 11", continuous circulation of pressurized water through the several cylindrical hollow walls 1, 1', 1", entering and leaving through the control rod introduction tubes 11, 11', 11", is admitted; simultaneously, the same flowing water serves to maintain the control rods cooled as well. As the fission reaction proceeds, it generates thermal energy at a rate proportional to the rate of reaction as regulated by the control rods, which manifests itself as sensible heat in the fuel elements 14, 14', 14"; the compressed air flowing through the annuli between the cylindrical hollow walls 1, 1', 1", passes longitudinally through the interstices in the processions of fuel elements 14, 14', 14", disposed therewithin, in intimate heat-transfer relationship with the surfaces of the fuel plates comprising the same, and consequently becomes substantially heated. The cylindrical hollow walls 1, 1', 1", by virtue of their substantial rigidity and structural strength, serve to support, position and anchor the fuel elements under the stresses imposed by the rapid rates of air flow therethrough, while the layers of thermal insulation 15, 15', 15", 15'", 15"", largely isolate the cylindrical hollow walls, 1, 1', 1" and their water content, as well as the aluminum cruciform strut 2, the air turning vanes 10, 10', the control rod introduction tubes 11, 11', 11", and other water-containing members, from the ravages of the heat of the fuel elements and the existing high-temperature compressed air stream. Such disposition of the cruciform strut 2, at the air-exiting extremity of the core, rather than at the air-entering extremity, largely avoids non-uniformity of distribution of the flow of compressed air to the several annuli due to the aerodynamic turbulence and eddying of the air stream about the arms of the cruciform strut 2, itself. Upon effluence at the air-exiting extremities of the annuli, the heated compressed air stream is diverted radially outwardly in all directions by each circumferential air-turning vane e.g. 10, removably mounted upon the left-hand extremity of each of the cylindrical hollow walls 1, 1', 1".

Then, referring to FIGURE 13, the stream of compressed air flowing radially outwardly passes through the interspace formed between the forward face of the inner aft shield tank 1301, of the aft shield assembly, and the aft concave header 1003 (shown in FIGURE 10) of the circumferential shield tank assembly, from whence it enters and flows rearwardly through the annular air outlet duct 1303. In the aft shield assembly, a stream of pressurized water is continually introduced into the water stream introduction tubes 1314, 1314', whence it fills and flows through the toroidal outer aft shield tank 1302, flows radially inwardly through the perforations 1315, 1315', in the streamlined slender support struts 1304, 1304', and into the forward compartment 1310, of the inner aft shield tank 1301; from there the water enters the perforations 1313, 1313', in half of the number of control rod introduction tube extention e.g. 1308', to be circulated rapidly through the cylindrical hollow walls 1, 1', 1'' (shown in FIGS. 1, 17 and 18) and returned through the other half of the control rod introduction tube extensions, e.g. 1308, exiting through the perforations 1312, 1312', therein into the aft compartment 1311, from whence the pressurized water, which has become heated somewhat in its journey, exits through water outlet tubes 1317, 1317'. In filling both the toroidal aft shield tank 1302, and the inner aft shield tank 1301, in the course of its journey, the water serves to attenuate substantially neutron and gamma radiations being emanated rearwardly from the reactor core; too, the tortuousness and spatial disposition of the annular air outlet duct 1303, avoids any straight line path of egress of such radiation through the aft shield tank assembly. Pressurized water is also circulated through the center tube 1306, from whence it circulates through the slender central tube 13 (shown in FIGS. 1, 17 and 18) of the core-reflector assembly. Upon effluence through the water outlet tubes 1317, 1317', and the center tube 1306, the pressurized water, which has become somewhat heated in its journey through the reactor core, is piped to the inlet extremity of the remote water recirculation loop shown in FIG. 20.

There, referring to FIG. 20, the circulating water is piped through water-to-air radiator 2001 and is thus cooled, is exposed to the pressurizer 2002 and thus the entire water system is pressurized, and is passed through the pump 2003, which repumps the cooled pressurized water stream back into the reactor core, e.g. into the water stream introduction tubes 1314, 1314' (shown in FIG. 13).

Then, again referring to FIGURE 14, the substantially heated compressed air stream exiting rearward from the aft shield tank assembly 1404, passes into the outlet scroll 1415, from whence it is distributed to each hot-air duct 1414, through which it is delivered to each delivery scroll 1411, which conducts it into the axial gas-turbine region 1408 of each of the turbo-jet engines 1405, 1405'. There, the heated compressed air is partially expanded through a turbine (not visible in FIGURE 14) contained therein, thereby driving the same, and consequently serving to drive the axial compressor (also not visible in FIGURE 14) within the axial compressor region 1407, shafted directly to the turbine, and finally the air is further expanded and jetted rearward to the atmosphere in each jet nozzle 1409, to provide substantial reactive thrust in the forward direction as the ultimate product of the entire power plant. Beneficially, the turbo-jet engines 1405, 1405', are located, with respect to the shielded reactor 1401, so as to afford as short a length of each hot-air duct 1414, rather than of the compressed-air duct 1412, as practicable, in order to minimize frictional losses of energy of the heated air at this point; this is thermodynamically justified, even though it be at the expense of increased length and thus pressure drop for each compressed-air duct 1412.

Turning to the remaining figures, FIGURE 15 depicts, in a front perspective view fashion, a modification of the FIGURE 14 power plant which has been found to facilitate installation in certain air-frames. Much the same as in FIGURE 14, this power plant comprises a shielded reactor 1401', including a circumferential shield tank assembly 1402', a forward shield tank assembly 1403'; and an aft shield tank assembly 1404', combined with a plurality of turbo-jet engines 1405'', 1405''', in this case four in number. As the fundamental difference, however, each hot-air duct 1414', conducting hot reactor-exiting air leads from the forward shield tank assembly 1403', while each compressed-air duct 1412', conducting reactor-entering air, leads to the aft shield tank assembly 1404'. Since the hot-air ducts e.g. 1414', are again made as short as practicable, this enables the turbo-jet engines to be displaced in the forward direction a distance approximating the entire length of the reactor; this advantageously affords increased ground clearance of the rear extremities of the turbo-jet engine for the tail-down landing attitude in certain air-frames. As a result of the cross-over of the ducting involved, the direction of air flow in shielded reactor 1401', is from rear to front rather than from front to rear as in the FIGURE 14 power plant; in view of the general longitudinal symmetry of the core-reflector assembly, such reversal would require no major revision of the interior of the shielded reactor itself. It is to be noted that despite the flow reversal, the disposition of the forward shield tank assembly 1403', is retained at the forward extremity of the reactor, in order to afford maximum radiation shielding protection in the forward direction (toward the crew), while the disposition of the aft shield tank assembly 1404', with its shielding efficacy being debilitated somewhat by the passage of control rod induction tube extensions 1308''', 1308'''' therethrough, is retained at the rear of the reactor.

Finally, FIGURE 16 illustrates, in phantom-view fashion, the operative installation of the FIGURE 15 power plant in a "B–36–D" airplane. There, the shielded reactor 1401', is mounted within the fuselage of an airplane 1601, with its nuclear-propelled turbo-jet engines 1405'', 1405''', associated with the reactor, being suspended immediately below and outside of the fuselage and aligned in the same direction therewith. In the nose of the airplane 1601, separated as far from the shielded reactor 1401', as practicable is a radiation-shielding-encased crew compartment 1602, wherein the entirety of the human crew and other especially-radiation-sensitive entities are adapted to be crowded during flight. Advantageously, the airplane's conventional cowled, chemically-fuelled engines 1603, 1603', in its wings have been retained; adapted to normally remain in dormant standby condition, such chemically-fuelled engines provide added thrust for short periods of substantially increased speed as may become exigent in emergencies. Integral with the forward extremities of the cowled chemically-fuelled engines 1603, 1603', are cowled water-cooling radiators 1604, 1604', provided to afford passage of the pressurized moderating water in heat-transfer relationship with atmospheric air for thereby cooling the water to enable its recirculation through the cylindrical hollow walls 1, 1', 1'' (shown in FIGS. 1, 17 and 18).

Further illustrations of the quantitative aspects and preferred parameters for the instant reactor core system in general, and the embodiments illustrated in the drawings in particular, is provided in the following specific example.

EXAMPLE

A full-scale shielded neutronic reactor, adapted to provide propulsive power for aircraft employing the air-cycle, substantially as illustrated in FIGURES 1 through 14, and adapted to installation operative propulsive installation in an airplane in the manner as illustrated in FIGURE 16, has been fully designed, developed, and engineered. The general details of materials, dimensions, and operational parameters, both for operation of the reactor when integrated with four modified "J–47–GE–11" turbo-jet engines for production of ca. 7,000 lbs. thrusts (5,000 ft. altitude; static) therewith, and for operation of the reactor when integrated with four modified "J–77" engines for production of 26,000 thrusts (15,000 ft. altitude; static) therewith are tabulated in Table I below.

Table I.—Design and operational data for air-cooled neutronic reactor and nuclear aircraft propulsion plant as illustrated in FIGURES 1 through 14

CONSTRUCTION OF REACTOR

Core:
- Nominal dimensions—
  - Diameter of active core (to inside of insulation around outer surface of outer fuel annulus) _____ 62.70 in.
  - Diameter (to inner surface of steel reflector shells) _____ 69.70 in.
  - Diameter (to outside surface of steel reflector shells) _____ 75.06 in.
  - Length of active core___ 36.00 in.
  - Overall length (total length of cylindrical hollow walls) _____ 55.95 in.
  - Number of cylindrical hollow walls _____ 9 (plus central tube).
  - Number of annuli _____ 9.
- Materials—
  - Cylindrical hollow walls _____ Aluminum.
  - Moderant _____ Water.
  - Fuel elements:
    - Metal _____ "25–20" Stainless steel.
    - Fissionable material _____ $UO_2$ (93.4% enriched in $U^{235}$).
  - Insulation _____ Silica-alumina felt ("Thermoflex R–F")
  - Insulation envelope _____ "25–20" Stainless steel foil.
  - Braze metal for hollow walls _____ No, 68%; Co, 20%; Si, 12%.
  - Reflector shells _____ Steel.
- Cylindrical hollow walls—
  - General:
    - Thickness of each smooth aluminum shell _____ 0.080 in.
    - Thickness of corrugated aluminum shell _____ 0.020 in.
    - Pitch of corrugations _____ ¼ in.
    - Maximum tolerable temperature for aluminum _____ 300° F.
    - Thickness of insulation (including envelope) _____ 0.20 in.
    - Boron content of "Thermoflex R–F" average _____ Ca. 0.0067%.
  - Diameters:

|  | I.D., in. | O.D., in. |
|---|---|---|
| Center Tube | 1.50 | 1.66 |
| Cylindrical Hollow wall: |  |  |
| #1 (from inside) | 8.86 | 11.18 |
| #2 | 18.38 | 20.70 |
| #3 | 27.00 | 29.32 |
| #4 | 34.70 | 37.02 |
| #5 | 41.48 | 43.80 |
| #6 | 47.30 | 49.66 |
| #7 | 52.74 | 55.06 |
| #8 | 58.44 | 60.46 |
| #9 | 63.10 | 65.42 |

Moderator water circulation rates—
- Center tube _____ 0.67 lb./sec.
- Cylindrical hollow wall:
  - #1 _____ 15.00.
  - #2 _____ 27.00.
  - #3 _____ 34.90.
  - #4 _____ 32.25.
  - #5 _____ 33.27.
  - #6 _____ 32.00.
  - #7 _____ 26.67.
  - #8 _____ 19.20.
  - #9 _____ 12.80.
- Total for center tube and hollow walls _____ Ca. 234.
- Pressure drop _____ 9.2 p.s.i.
- Water pressure (inlet) __ 80.0 p.s.i.g.
- Water pressure (outlet) _____ 60±10 p.s.i.g.
- Cruciform strut _____ 12 lb./sec.
- Reflector water tank ___ 21 lb./sec.

Thermal energy loss to water—
- To moderator water in cylindrical hollow walls _____ 6.33% of total generated.
- To strut cooling water __ 0.42%.
- To water reflector _____ 0.58%.

Table I.—Continued

Annuli:
- Thickness (from insulation to insulation)—
  - #1 annulus (from inside) _____ 3.20 in.
  - #2 _____ 3.20 in.
  - #3 _____ 2.75 in.
  - #4 _____ 2.29 in.
  - #5 _____ 1.83 in.
  - #6 _____ 1.37 in.
  - #7 _____ 1.14 in.
  - #8 _____ 1.14 in.
  - #9 _____ 0.92 in.

Fuel elements:
- Type fin spaced corrugated fuel plate stacks (as shown in Fig. 5).
- Distribution—
  - No. of slightly-spaced longitudinal stages __ 11.
  - Length of each longitudinal stage:
    - 1 thru 9 (from front) _____ 3.49 in.
    - 10 and 11 _____ 1⅔ in.
  - No. of fuel-element containing annuli _____ 9.
  - Heated heat transfer area _____ 5570 sq. ft.
  - Total steel area _____ 5638.6 sq. ft.
- Fuel plates—
  - Approximate average thickness _____ 0.0137 in.
  - Nominal thickness of stainless steel outer cladding sheets _____ 0.004 in.
  - $UO_2$ content _____ Ca. 30% by weight.
  - Enrichment of uranium in $U^{235}$ _____ 93.4%.
- Total heat transfer area per longitudinal stage — Stage (from front of reactor):
  - #1 _____ 351.0 ft.²
  - #2 _____ 403.6 ft.²
  - #3 _____ 462.1 ft.²
  - #4 _____ 521.0 ft.²
  - #5 _____ 567.5 ft.²
  - #6 _____ 613.2 ft.²
  - #7 _____ 656.8 ft.²
  - #8 _____ 675.4 ft.²
  - #9 _____ 675.4 ft.²
  - #10A _____ 325.6 ft.²
  - #10B _____ 322.2 ft.²

Representative variation of average fuel-plate thickness among the several annuli—

| For stage #1 | Thickness of Fuel Plate, in. |
|---|---|
| #1 annulus | 0.0159 |
| #2 | 0.0154 |
| #3 | 0.0151 |
| #4 | 0.0146 |
| #5 | 0.0142 |
| #6 | 0.0137 |
| #7 | 0.0136 |
| #8 | 0.0151 |
| #9 | 0.0176 |

Average fuel plate operating temperature, °F., (design point)—
- Stage #1 _____ 1385.
- Stage #2 _____ 1390.
- Stage #3 _____ 1440.
- Stage #4 _____ 1500.
- Stage #5 _____ 1515.
- Stage #6 _____ 1575.
- Stage #7 _____ 1585.
- Stage #8 _____ 1605.
- Stage #9 _____ 1620.
- Stage #10A _____ 1605.
- Stage #10B _____ 1600.

Overall fuel element composition (approx.)—

|  | Stainless Steel, lb. | $UO_2$, lb. |
|---|---|---|
| Total | 1,413 | 188 |
| Outer cladding sheets | 94.7 | 0 |
| Central compacts | 466 | 188 |

Nominal composition of active portion of core—

| Material | Volume Percent | Weight (lb.) |
|---|---|---|
| Water | 28.6 | 1,206 @ 70° F. 1,138 @ 250° F. |
| Air | 44.98 | |
| Stainless steel, total | 5.22 | 1,820 |
| Aluminum | 8.8 | 1,028 |
| Insulation | 12.0 | 96 |
| $UO_2$ (93.4% enriched) | 0.40 | 188 |
| Total | | 4,338 |

*Table I.—Continued*

Reflector:
- Reflector inside diameter — Ca. 65.5 in.
- Diameter inside of water in reflector tube — 65.7 in.
- Diameter inside of steel reflector shell pair — 69.7 in.
- Diameter outside of steel reflector shell pair — 75.06 in.
- Steel weight — Ca. 7350 lb.
- Reflector steel shell pair coolant, percent by volume — 18.7%.

Reactor Shield:
- Circumferential shield—
  - Water thickness, nominal — 28.9 in.
  - Steel thickness, nominal — 2.1 in.
- Forward shield tank assembly—
  - Lead thickness, nominal — 2.75 in.
  - Steel Thickness, nominal — 2.75 in.
  - Total ducted thickness, average — 73.0 in.
- Aft shield tank assembly—
  - total ducted thickness average — 53.0 in.
- Boron concentration desired in water for circumferential and forward shield tank assemblies — 0.66% by wt.

Reactivity control:
- Number of control rods — 52.
- Diameter of control rod — 0.5 in. O.D.
- Length of travel into reactor core — 30 in.
- Length of movement — 30 in.
- Neutron absorbing material used in control rods — Boron (0.7 gm./cc.).
- Length of active absorber in rods — 30 in.
- Diameter of active absorber in rods — 0.375 in.
- Types of control rods:
  - Dynamic (constantly acting).
  - Source (contain neutron source for initiating chain reaction at start-up).
  - Shim (for rough setting of reactivity range, and for rapid complete insertion for shut-down).

Control rods:
- Dynamic rods—
  - Number — 2.
  - Speed of response (30 inch movement) — 200 milliseconds.
  - Accuracy of positioning by positioning means — 0.10 in.
- Source rod—
  - Number — 1.
  - Speed of response (30 inch movement) — 200 milliseconds.
  - Accuracy of positioning — 0.10 in.
- Shim rods—
  - Number — 48.
  - Maximum velocity in standard operation — 1.0 ft./min.
  - Time from release to full insertion for panic shut-down of reactor — 150 milliseconds.
  - Accuracy of positioning — 0.10 in.
- Disposition of rods—

| Hollow Wall | No. of rods | Type | $\Delta k/k$* per rod, percent | Heat generated per rod (Design point), kw. |
|---|---|---|---|---|
| #1 | 3 | {2 dynamic. 1 source} | 0.311 | 7.60 |
| #2 | 8 | shim | 0.289 | 7.05 |
| #3 | 12 | ...do | 0.256 | 6.25 |
| #4 | 8 | ...do | 0.219 | 5.34 |
| #5 | 12 | ...do | 0.184 | 4.50 |
| #6 | 8 | ...do | 0.148 | 3.60 |
| (No rods in housings in remaining hollow walls.) | | | | |

*$k$ = multiplication factor of reactor core = the $k_{eff}$ which would obtain if the particular core were extended to infinite size, so as to avoid the permanent escape of neutrons which occurs from a core of finite size.

where
$k_{eff}$ = effective multiplication constant of reactor core = statistical number of neutrons generated by fission in one generation per each neutron generated in the preceding generation—in other words, the number of neutrons actually completing the cycle of deceleration, thermal diffusion in core, absorption in fissionable material, and fission, per one starting from fission.

$\Delta k$ = change in $k$ produced by full introduction of the particular control rod.

*Table I.—Continued*

Control rods—Continued
- Radiation-determination instrumentalities—
  - Type of start-up sensor — Fission chamber.
  - Number of start-up sensors — 9.
  - Type of operating sensor — Compensated ionization chamber.
  - Number of operating sensors — 6.

Nuclear data:
- Multiplication constant ($K_\infty$) — 1.432.
- Age to thermal ($\tau = L_t^2$) — Ca. 200 cm.$^2$.
- Thermal diffusion area ($L^2$) — Ca. 13 cm.$^2$.
- Average total life of neutron — $8.43 \times 10^{-5}$ sec.
- Energy of thermal base — 0.034 ev.
- Effective fraction of delayed neutrons — 0.00856.
- Resonance escape probability ($P_{th}$) — 0.883.
- Thermal utilization factor ($f$) — 0.675.
- Neutron loss due to direct streaming (thru ducts) — 5%.
- At power level of 155,000 kw.—
  - Uranium depletion after 100 hrs. operation — 2 lb.
  - Average thermal neutron flux in fuel element — $0.82 \times 10^{14}$ neutrons/cm.$^2$/sec.
  - Average thermal neutron flux in water — $1.27 \times 10^{14}$ n./cm.$^2$/sec.
  - Virgin flux — $5.8 \times 10^{13}$ n./cm.$^2$/sec.
  - Equivalent reflected buckling ($H^2$) — 0.00125 cm.$^{-2}$.
- Approximate disposition of neutrons:
  - To production — 40%.
  - To leakage — 29%.
  - To absorption — 31%.

Overall reactor dimensions:
- Size—
  - Outside diameter of shielded reactor — 120 in.
  - Length over scrolls — 246 in.
  - Length without scrolls — 148.5 in.
- Weight—
  - Total reactor-shield-scrolls-ducts assembly — 119,000 lbs.
  - Forward scroll-duct-scrolls distributor — 1,100 lbs.
  - Forward shield tank assembly (less water) — 20,680 lbs.
  - Circumferential shield tank assembly (less water) — 20,810 lbs.
  - Aft shield tank assembly (less water) — 13,680 lbs.
  - Aft scroll-ducts-scrolls distributor — 1,430 lbs.
  - Core-reflector assembly (less water) — 13,210 lbs.
  - Shield water — 33,650 lbs.
  - Moderator and reflector water — 9,550 lbs.
  - Fuel elements — 2,000 lbs.
  - Insulation and miscellaneous — 1,080 lbs.
  - Reactor accessories — 1,810 lbs.

OPERATION IN COMBINATION WITH FOUR MODIFIED "J–47–GE–11" TURBO-JET ENGINES
- Weight of modified engines — Ca. 3200 lb. each.
- Reactor operation:
  - Air mass flow rate — 238 lb./sec.
  - Reactor inlet air temperature — 426° F.
  - Reactor outlet air temperature — 1400° F.
  - Reactor inlet pressure at inlet-scroll forward-shield-assembly flanges — 56.1 p.s.i.a.
  - Reactor outlet pressure at outlet-scroll aft-shield assembly flanges — 48.9 p.s.i.a.
  - Heat release rate—
    - Total — 67,760 B.t.u./sec.
    - To air — 60,400 B.t.u./sec.
    - To moderator and shield water — 7,360 B.t.u./sec.
  - Reactor power level — 71,690 kw.
  - Maximum fuel plate temperature (design) — 1650° F.
  - Maximum fuel plate temperature (allowable) — 1800° F.
  - Inlet Mach number—
    - Ducts — 0.174.
    - Core inlet — 0.102.
  - Exit Mach number—
    - Core outlet — 0.158.
    - Ducts — 0.182.
  - Outlet pressure/inlet pressure — 0.93.
  - Average heat transfer coefficient — 80 B.t.u./hr./sq. ft./° F.

Table I.—Continued

Reactor operation—Continued
Moderator water—
- Inlet temperature _____ 220° F.
- Outlet temperature ____ 245° F.

Turbo-jet engine operation (5000 ft. altitude; static):
Engine speed—
- Design maximum _____ 7950 r.p.m.
- Maximum safe _____ 8100 r.p.m.
- Airflow _____ 59.7 lb./sec.
- Compressor pressure ratio __ 4.95.
- Turbine inlet temperature __ 1400° F.
- Compressor discharge pressure _____ 60.6 p.s.i.a.
- Turbine inlet pressure _____ 42.5 p.s.i.a.
- Oil flow maximum _____ 3.6 g.p.m./engine.
- Thrust from four engines ___ 7,000 lb.

Turbo-jet engine dimensions:
- Engine center line to compressor flange _____ 24.87 in.
- Engine center line to turbine flange _____ 26.00 in.
- Compressor rotor tip diameter, first stage _____ 27.2 in.
- Overal engine length _____ 19 ft.

OPERATION IN COMBINATION WITH FOUR MODIFIED "J-77" TURBO-JET ENGINES

Weight of modified engine _____ 3500-3750 lb.
Reactor operation:
- Air mass flow rate _____ 663 lb./sec.
- Reactor inlet air temperature _____ 591° F.
- Reactor outlet air temperature _____ 1400° F.
- Reactor inlet air pressure __ 101 p.s.i.a.
- Outlet pressure/inlet pressure _____ 0.882.
- Heat release rate—
  - Total _____ 152,784 B.t.u./sec.
  - To air _____ 139,000 B.t.u./sec.
  - To moderator and shield water _____ 13,784 B.t.u./sec.
- Reactor power level _____ 161,157 kw.
- Maximum fuel plate temperature (design) _____ 1650° F.
- Maximum fuel plate temperature (allowable) _____ 1800° F.
- Inlet Mach number—core inlet _____ 0.142.
- Exit Mach number—core outlet _____ 0.224.
- Average heat transfer coefficient _____ Ca. 190 B.t.u./hr./sq. ft./° F.**
- Moderator water—
  - Inlet temperature _____ 220° F.
  - Outlet temperature ____ 275° F.
- Moderator water circulation rate _____ 267 lb./sec.

Turbo-jet engine operation (15,000 ft. altitude static):
- Air flow _____ 165 lb./sec.
- Engine speed _____ 7500-8000 r.p.m.
- Thrust from four engines ___ 26,000 lb.

Installation in "B-36-D" airplane:
- Weight modified airplane complete with wing-mounted chemically-fueled engines, modest cargo, and small quantity gasoline, with moderator-cooling radiators installed _____ 180,000-190,000 lb.
- Inside diameter of fuelage (just aft of wing root)—
  - Within ribs _____ Ca. 10 ft.
  - To inside of fuselage skin _____ Ca. 10 ft. 6 in.
- Length of airplane _____ Ca. 160 ft.
- Wingspan of airplane _____ Ca. 240 ft.
- Diameter of reactor mounted within fuselage _____ =120 in.
- Extra shielding affixed to fuselage wall circumferentially surrounding reactor shield—
  - Material _____ Polyethylene plastic.
  - Thickness _____ 2.5 in.

Shielded crew compartment:
- Distance between rear face crew shield and center line of reactor _____ 60 ft. 10 in.
- Compartment shielding—
  - Aft:
    - Lead thickness _____ 2.5 in.
    - Polyethylene plastic thickness _____ 24.0 in.
  - Sides:
    - Lead _____ 0.25 in.
    - Polyethylene plastic _ 12.0 in.
  - Forward End:
    - Lead (or leaded glass) _____ 0.25 in. equiv. of lead.
    - Polyethylene plastic _ 9.0 in.
- Weight of crew compartment shield _____ 37,000 lb.
- Weight of shielded nuclear power plant _____ Ca. 133,500 lb.
- Total weight of nuclear powered airplane _____ 360,000 lb.
- Performance (solely nuclear propulsion) _____ 300 m.p.h. at 15,000 ft. altitude.

**By virtue of the more rapid air flow over heating surfaces.

While this invention has been described with particular emphasis upon the rather highly developed specific reactor design, suitable for practical application, outlined in the drawings and the specific example, it is inherently susceptible to wide variation. For example, while utilization of metallic fuel elements has been stressed, or higher-temperature operation the use of similarly-stacked ceramic fuel plates would be advantageous. Too, while uranium-235 is the particular fissionable isotope selected for use in the illustrated reactor, other fissionable isotopes as plutonium-239 or uranium-233 could well be used in its stead; likewise, while the oxide form of the fuel element was specified, other forms, for example the carbide form, are also applicable.

Furthermore, concerning the illustrated application of the reactor in constituting a nuclear aircraft propulsion plant, while complete removal of the chemical-fuelled combustion chambers from the modified turbo-jet engines has been specified, the same may alternatively be retained to afford enhanced flexibility and performance. In such case, the heated air, in returning from the reactor, would be passed through the normally-dormant combustion chambers before entering the turbine, whereupon thermal energy supplied by chemical combustion therein could be used for short periods to supplement that provided nuclearly during any desired reduction in reactor power-production level. For this purpose, standard combustion tube units, as conventionally employed in turbo-jet engines, may be installed in the hot air ducts leading from the reactor outlet scrolls to the turbine delivery scrolls. Particularly effective, along this line, is the installation of standard chemically-fuelled after-burners in the jet nozzle portions of the turbo-jet engines following the turbine; these may be operated for short periods during flight to afford spurts of greater speed when desirable. In addition to aircraft propulsion, the illustrated reactor may be used for providing propulsive power for other mobile craft, such as ships and submarines; for such applications, it is convenient to employ a closed cycle gas turbine engine, deriving its thermal energy from the reactor, with the entire air stream being recycled, and delivering its energy in the form of turbine shaft power for driving the propeller shafts of the ship.

Importantly, the very arrangement illustrated in FIGURES 1 through 14 and set forth in the example—e.g. the combination involving a plurality of "J-47-GE-11" engines—is operable and effective in stationary operation for varied uses. More particularly, as by-products of the fission reaction, significant quantities of radioactive fission products are generated within the fuel elements during reactor operation; these valuable side products may be recovered by periodically discharging fuel elements from the stationary reactor, dissolving and chemically processing the same. In the same manner, it is possible to utilize such a stationary reactor for the production of extremely valuable fissionable materials, for example by bombarding uranium-238 with the intense neutron flux within the reactor core to transmute the same to fissionable plutonium-239. That is, while operation of the illustrated reactor in the specified manner, employing substantially isotopically pure uranium-235, would entail no such transmutation to plutonium-239, yet by appropriately enlarging the reactor core and employing isotopically impure fissionable material, such as uranium-235 accompanied by a substantial proportion of uranium-238, in constituting the fuel elements, subsequently-recoverable plutonium-239 will be generated in the fuel elements during reactor operation. In similar fashion, the present reactor is readily adapted to extensive production of fissionable uranium-233 during stationary operation, by merely enlarging the reactor core and incorporating a fertile material, such as natural thorium (thorium-232) in the reflector; thereupon, the high neutron flux transmutes the thorium-232 to thorium-233, which forthwith spontaneously decays, through protactinium-233, to uranium-233 which may subsequently be recovered. Stationary operation of the reactor is also useful for empirical testing of materials of construction under the simultaneous conditions of high-temperature and high-neutron-flux afforded within its core; samples of materials to be tested may simply be inserted, within certain of the control-rod-free control rod introduction tubes in the outer cylindrical hollow walls, to the interior of the operating reactor core. Such use extends to the empirical testing of radiation shielding media; by virtue of the compactness and high neutron flux of this reactor, as well as the ready replaceability of much of its circumferential shielding—particularly the borated water portion—the illustrated reactor affords a splendid tool for such testing while in stationary operation. Other variations and applications of the hereinbefore-disclosed core system and overall reactor will become apparent to those skilled in the art. It is, therefore, to be understood that all matters contained in the above description and example are illustrative only, and do not limit the scope of the present invention.

What is claimed is:

1. An improved neutronic fission reactor core, adapted to provide propulsive power by heating gas flowed in heat-transfer relationship therethrough, which comprises: an amassed multiplicity of fissionable-material-containing fuel elements adapted to engage while so amassed in self-sustaining chain fission reaction with concomitant generation of heat; interpersed therebetween metallic structure constituted of hollow wall structure with a plurality of said hollow walls being disposed in the configuration of a nesting of concentric, spaced-apart, co-extensive, open-ended cylinders, which cylinders mechanically confine and support said elements in the concentric annuli formed between said cylinders and define the principal conduit system for conducting said gas in heat-transfer relationship with said fuel elements; gas flowed through said principal conduit system in heat-transfer relationship with said fuel elements constituting the principal coolant for said fuel elements; thermal insulation interposed between substantially the total mass of said metallic structure defining said principal conduit system and said fuel elements along with said gas; and, flowing within said hollow walls, hydrogenous liquid thereby maintained in neutron moderation relationship with said fuel elements and in flowing, heat-transfer relationship with said metallic structure, and maintained at an operating temperature substantially lower than that of said fuel elements, constituting the principal neutron moderator for the core and the principal coolant for said insulated metallic structure, and means for continuously cooling said circulating hydrogenous liquid.

2. An improved neutronic fission reactor core, adapted to provide propulsive power by heating air flowed in heat-transfer relationship therethrough, which comprises: an amassed multiplicity of fissionable-material-containing fuel elements adapted to engage while so amassed in self-sustaining chain fission reaction with concomitant generation of heat; interspersed therebetween metallic structure constituted of hollow wall structure with a plurality of said hollow walls being disposed in the configuration of a nesting of concentric, spaced-apart, co-extensive, open-ended cylinders which cylinders mechanically confine and support said elements in the concentric annuli formed between said cylinders and define the principal conduit system for conducting said air in heat-transfer relationship with said fuel elements; air flowed through said principal conduit system in heat-transfer relationship with said fuel elements constituting the principal coolant for said fuel elements; thermal insulation interposed between substantially the total mass of said metallic structure defining said principal conduit system and said fuel elements along with said air; and, flowing within said hollow walls, water under superatmospheric pressure thereby maintained in neutron moderation relationship with said fuel elements and in flowing, heat-transfer relationship with said metallic structure, and maintained at an operating temperature substantially lower than that of said fuel elements, constituting the principal neutron moderator for the core and the principal coolant for said insulated metallic structure; and a neutron reflector, jacketing said core, comprising an assemblage of iron and water.

3. An improved neutronic fission reactor core, adapted to provide propulsive power by heating air flowed in heat-transfer relationship therethrough, which comprises: an amassed multiplicity of fissionable-material-containing fuel elements adapted to engage while so amassed in self-sustaining chain fission reaction with concomitant generation of heat; interspersed therebetween metallic structure constituted of hollow wall structure with a plurality of said hollow walls being disposed in the configuration of a nesting of concentric, spaced-apart, co-extensive, open-ended cylinders, which cylinders mechanically confine and support said elements in the concentric annuli formed between said cylinders and define the principal conduit system for conducting said air in heat-transfer relationship with said fuel elements; air flowed through said principal conduit system in heat-transfer relationship with said fuel elements constituting the principal coolant for said fuel elements; thermal insulation interposed between substantially the total mass of said metallic structure defining said principal conduit system and said fuel elements along with said air; and, flowing within said hollow walls, water under superatmospheric pressure thereby maintained in neutron moderation relationship with said fuel elements and in flowing, heat-transfer relationship with said metallic structure, and maintained at an operating temperature substantially lower than that of said fuel elements, constituting the principal neutron moderator for the core and the principal coolant for said insulated metallic structure; and at least one mass of highly-neutron-absorptive material selected from the group consisting of boron and cadmium values adapted to adjustable insertion into the said reactor core, thereby to restrain adjustably the degree of chain fission reactivity of the amassment.

4. The reactor core of claim 1 wherein said gas is air, and wherein said hydrogenous liquid is water maintained under substantial superatmospheric pressure.

5. The reactor core of claim 1 wherein said gas is air, wherein said hydrogenous liquid is water maintained under substantial superatmospheric pressure, and wherein said metallic hollow wall structure is constituted of aluminum.

6. The reactor core of claim 1 wherein said gas is air, wherein said hydrogenous liquid is water maintained under substantial superatmospheric pressure, and wherein said fuel elements comprise stainless-steel-surfaced, predominantly-stainless-steel bodies having fissionable material disposed therewithin in heat-transfer relationship with the stainless steel surfaces thereof.

7. The reactor core of claim 1 wherein said gas is air, wherein said hydrogenous liquid is water maintained under substantial superatmospheric pressure, and wherein said metallic structure is constituted of corrugated aluminum sheet sandwiched between, and bonded to, smooth aluminum sheet constituting the walls of said hollow wall structure.

8. The reactor core of claim 1 wherein said gas is air, wherein said hydrogenous liquid is water maintained under substantial superatmospheric pressure, and wherein said metallic structure is constituted of corrugated aluminum sheet sandwiched between, and bonded to, smooth aluminum sheet constituting the walls of said hollow wall structure, thereby providing a substantially-rigid hollow wall structure, with a plurality of such hollow wall structures being disposed in the configuration of an array of shelves adapted to support said fuel elements.

9. The reactor core of claim 1 wherein said gas is air, wherein said hydrogenous liquid is water maintained under substantial superatmospheric pressure, and wherein said metallic structure is constituted of corrugated aluminum sheet sandwiched between, and bonded to, smooth aluminum sheet constituting the walls of said hollow wall structure, thereby providing a substantially-rigid hollow wall structure, each cylinder being mounted from the same extremity as a cantilever beam upon a common supporting strut.

10. The reactor core of claim 1 wherein said gas is air, wherein said hydrogenous liquid is water maintained under substantial superatmospheric pressure, and wherein said hollow walls are adapted to conduct circulating water in the configuration of discrete layers, each approximating one inch in thickness.

11. The reactor core of claim 1 wherein said gas is air, wherein said hydrogeneous liquid is water maintained under substantial superatmospheric pressure, wherein said hollow walls are adapted to conduct flowing water in the configuration of discrete layers, each approximating one inch in thickness, and wherein said metallic structure is constituted of corrugated aluminum sheet, of approximately ¼ inch pitch between successive corrugations, sandwiched between, and bonded to, paired smooth aluminum sheets spaced approximately one inch apart.

12. The reactor core of claim 1 wherein said gas is air, wherein said hydrogenous liquid is water maintained under substantial superatmospheric pressure, and wherein said thermal insulation has a thermal conductivity at least as low as approximately 1 B.t.u. in./hr./sq. ft./° F. at a mean temperature approximating 1000° F.

13. The reactor core of claim 1 wherein said gas is air, wherein said hydrogenous liquid is water maintained under substantial superatmospheric pressure, and wherein said thermal insulation comprises predominantly an admixture of alumina and silica.

14. The reactor core of claim 1 wherein said gas is air, wherein said hydrogenous liquid is water maintained under substantial superatmospheric pressure, and wherein said thermal insulation comprises predominantly an admixture of alumina and silica in the form of felt.

15. The reactor core of claim 1 wherein said gas is air, wherein said hydrogenous liquid is water maintained under substantial superatmospheric pressure at least as great as approximately 60 p.s.i., introduced to the core at a temperature at least as low as approximately 220° F., and is retained within the core for a residence time at least as short as approximately 5 seconds, wherein said hollow walls are adapted to conduct flowing water in the configuration of discrete layers, each approximating 1 inch in thickness, and wherein said thermal insulation has a thermal conductivity at least as low as approximately 1 B.t.u./in./hr./sq. ft./° F. at a mean temperature approximating 1000° F., and envelops said metallic structure and water-conducting ducts to a thickness approximating ⅕ inch.

16. The reactor core of claim 1 wherein said gas is air, wherein said hydrogenous liquid is water maintained under substantial superatmospheric pressure, and wherein said fuel elements comprise stacks of substantially-parallel, substantially-coextensive, spaced-apart corrugated plates having fissionable material disposed therewithin in heat-transfer relationship with the surfaces thereof.

17. The reactor core of claim 1 wherein said gas is air, wherein said hydrogenous liquid is water maintained under substantial superatmospheric pressure, and wherein said fuel elements comprise stacks of substantially-parallel, substantially-coextensive, spaced-apart, corrugated plates, with corrugations aligned substantially parallel to the direction of said passage of air therethrough, having fissionable material comprising uranium substantially isotopically enriched with respect to uranium-235 disposed therewithin in substantial thermally-conductive relationship with the surfaces thereof.

18. The reactor core of claim 1 wherein said gas is air, wherein said hydrogenous liquid is water maintained under substantial superatmospheric pressure, and wherein said fuel elements comprise stacks of substantially-parallel, substantially-coextensive, spaced-apart ceramic plates comprising predominantly silicon carbide together with a minor proportion of uranium carbide, highly enriched with respect to uranium-235, dispersed therewithin in substantial thermally-conductive relationship with the surfaces of said plates.

19. The reactor core of claim 1 wherein said gas is air, wherein said hydrogenous liquid is water maintained under substantial superatmospheric pressure, and wherein said fuel elements comprise stacks of substantially-parallel, substantially-coextensive, spaced-apart, corrugated, stainless - steel - surfaced, predominantly-stainless-steel plates, with the corrugations thereof aligned substantially parallel to the direction of said passage of air therethrough, with said plates having uranium dioxide substantially isotopically enriched with respect to uranium-235 disposed therewithin in substantial thermally-conductive relationship with the surfaces thereof.

20. The reactor core of claim 1 where in said gas is air, wherein said hydrogenous liquid is water maintained under substantial superatmospheric pressure, and wherein said means for continually cooling said flowing hydrogenous liquid is a radiator, disposed external the core, adapted to the passage of said hydrogenous liquid therethrough in heat-transfer relationship with atmospheric air for thereby cooling said hydrogenous liquid.

21. In a neutronic-fission-reactor-powered gas-turbine engine comprising a shaft-driven air compressor adapted to deliver a continuous stream of compressed atmospheric air, a neutronic fission reactor core adapted to provide propulsive power by heating said continuous stream of compressed atmospheric air flowed in heat-transfer relationship therewith, and a shaft-driving turbine adapted to drive such shaft-driven air compressor and adapted to be propelled by the at-least-partial expansion of said continuous stream of compressed air therethrough subsequent to its passage in heat-transfer relationship with said reactor core, the improved neutronic fission reactor core which comprises: an amassed multiplicity of fissionable-material-containing fuel elements adapted to engage while so amassed in self-sustaining chain fission reaction with concomitant generation of heat and further adapted to passage of air in heat-transfer relationship therethrough as the principal coolant for said fuel elements; interspersed therebetween metallic structure, adapted to confine mechanically said elements and constitute the principal conduit means for conducting said gas in heat-transfer relationship with said elements; also interspersed therebetween, ducts, adapted to conduct flowing water maintained under substantial superatmospheric pressure in neutron-moderation relationship with said elements and in heat-transfer relationship with said structure; thermal insulation adapted to insulate substantially the total mass of all said conduit structure proximate said fuel elements and also said liquid from said elements; and, flowing through said ducts, water maintained under substantial superatmospheric pressure and maintained at an operating temperature substantially lower than that of said elements to serve as the principal neutron moderant for the core and as the principal coolant for maintaining said insulated structure at an operating temperature substantially lower than that of said elements.

22. The improved neutronic fission reactor core in a gas-turbine engine of claim 21, wherein said fuel elements comprise stacks of substantially-parallel, substantially-coextensive, spaced-apart ceramic plates having fissionable material comprising uranium substantially isotopically enriched with respect to uranium-235 dispersed therewithin in substantial thermally-conductive relationship with the surfaces thereof, and wherein the proportion of said reactor core devoted to passage of said compressed air stream therethrough approximates 25 to 35% by volume.

23. The improved neutroic fission reactor core in a gas-turbine engine of claim 21, wherein said fuel elements comprise stacks of substantially-parallel, substantially-coextensive, spaced-apart, stainless-steel-surfaced, predominantly-stainless-steel plates having fissionable material comprising uranium substantially isotopically enriched with respect to uranium-235 disposed therewithin in substantial thermally-conductive relationship with the surfaces thereof, and wherein the proportion of said reactor core devoted to said passage of the compressed air stream therethrough approximates 35 to 60% by volume.

24. The improved neutronic fission reactor core in a gas-turbine engine of claim 21, wherein said fuel elements comprise stacks of substantially-parallel, substantially-coextensive, spaced-apart plates having fissionable material comprising uranium values substantially isotopically enriched with respect to uranium-235 disposed therewithin in substantial thermally-conductive relationship with the surfaces thereof, and wherein the molar ratio of said water to said uranium-235 isotope included within said reactor core is at least as great as approximately 100:1.

25. The improved neutronic fission reactor core in a gas-turbine engine of claim 21, wherein said fuel elements comprise stacks of substantially-parallel, substantially-coextensive, space-apart, corrugated, stainless-steel-surfaced, predominantly-stainless-steel plates, with corrugations aligned substantially parallel to the direction of said passage of air therethrough, having fissionable material comprising uranium dioxide substantially isotopically enriched with respect to uranium-235 disposed therewithin in substantial thermally-conductive relationship with the surfaces thereof, with the thickness of each of said plates approximating the range of 0.010 to 0.015 inch.

26. The improved neutronic fission reactor core-reflector system of claim 2 wherein said reflector comprises a compact assemblage of iron and water in approximately 50% to 50% volumetric ratio, and of thickness approximating ½ foot.

27. The reactor core of claim 3, wherein said mass of highly-neutron-absorptive material comprises boron values, and wherein said mass comprising boron values is adjustably insertable within said water component of said core.

28. The reactor core of claim 3, wherein said highly-neutron-absorptive material comprises boron values, wherein said mass comprising boron values are adapted to adjustable insertion within said water component of said reactor core, and wherein said mass comprising boron values is adapted to displace water from the reactor core upon its adjustable insertion within said water component.

References Cited in the file of this patent

UNITED STATES PATENTS

| | | |
|---|---|---|
| 2,832,733 | Szilard | Apr. 29, 1958 |
| 2,868,708 | Vernon | Jan. 13, 1959 |

FOREIGN PATENTS

| | | |
|---|---|---|
| 286,658 | Switzerland | Mar. 2, 1953 |

OTHER REFERENCES

Nucleonics, June 1953, pp. 18–25, 27–34, 51–58.
American Aviation, July 15, 1950, pp. 11–15.
Popular Science, October 1951, pp. 98–102.
Metal Progress, May 1949, pp. 635–640.